United States Patent
Bagheri

(10) Patent No.: US 11,481,060 B2
(45) Date of Patent: Oct. 25, 2022

(54) TOUCH PANEL PRESSURE DETECTION

(71) Applicant: Cambridge Touch Technologies Ltd., Cambridge (GB)

(72) Inventor: Mojtaba Bagheri, Cambridge (GB)

(73) Assignee: Cambridge Touch Technologies Ltd., Cambridge (GB)

(*) Notice: Subject to any disclaimer, the term of this patent is extended or adjusted under 35 U.S.C. 154(b) by 0 days.

(21) Appl. No.: 16/636,668

(22) PCT Filed: Aug. 7, 2018

(86) PCT No.: PCT/GB2018/052249
§ 371 (c)(1),
(2) Date: Feb. 5, 2020

(87) PCT Pub. No.: WO2019/030513
PCT Pub. Date: Feb. 14, 2019

(65) Prior Publication Data
US 2021/0055832 A1    Feb. 25, 2021

(30) Foreign Application Priority Data
Aug. 8, 2017 (GB) .................... 1712706

(51) Int. Cl.
*G06F 3/041* (2006.01)
*G06F 3/044* (2006.01)

(52) U.S. Cl.
CPC .......... *G06F 3/0414* (2013.01); *G06F 3/0445* (2019.05); *G06F 3/0446* (2019.05);
(Continued)

(58) Field of Classification Search
CPC ............. G06F 3/0414; G06F 3/041661; G06F 3/0445; G06F 3/0446; G06F 2203/04106;
(Continued)

(56) References Cited

U.S. PATENT DOCUMENTS 5,543,590 A   8/1996  Gillespie et al.
9,569,035 B1  2/2017  Lee et al.
(Continued)

FOREIGN PATENT DOCUMENTS

EP   0574213 A1   12/1993
EP   2899615 A1   7/2015
(Continued)

OTHER PUBLICATIONS

Combined Search and Examination Report under Sections 17 and 18(3) for United Kingdom application GB1712706.9, dated Feb. 7, 2018, 8 pages.
(Continued)

*Primary Examiner* — Temesghen Ghebretinsae
*Assistant Examiner* — Ivelisse Martinez Quiles

(57) ABSTRACT

A device for touch panel pressure detection includes a plurality of first input/output terminals for a projected capacitance touch panel. The projected capacitance touch panel includes a layer of piezoelectric material disposed between a plurality of sensing electrodes and a common electrode. The device also includes one or more amplifiers. Each amplifier has an inverting input, a non-inverting input and an output. The non-inverting input of the or each amplifier is configured to be switched between a common mode voltage and a capacitance measurement signal. The inverting input of the or each amplifier is configured to drive an input/output terminal based on the capacitance measurement signal. The amplifier is configured such that, when an input/output terminal is connected to a sensing electrode, the amplifier output varies in dependence upon a pressure applied to the touch panel.

19 Claims, 15 Drawing Sheets

(52) U.S. Cl.
CPC ............... *G06F 3/041661* (2019.05); *G06F 2203/04106* (2013.01)

(58) Field of Classification Search
CPC ............... G06F 3/0416; G06F 3/044; G06F 2203/04105; G06F 3/041–04886
See application file for complete search history.

(56) References Cited

U.S. PATENT DOCUMENTS

| | | | |
|---|---|---|---|
| 9,690,408 | B1 | 6/2017 | Krah |
| 9,983,715 | B2 | 5/2018 | Filiz et al. |
| 10,120,478 | B2 | 11/2018 | Filiz et al. |
| 10,126,807 | B2 | 11/2018 | Nathan et al. |
| 10,254,894 | B2 | 4/2019 | Nathan et al. |
| 10,282,046 | B2 | 5/2019 | Nathan et al. |
| 10,310,659 | B2 | 6/2019 | Nathan et al. |
| 10,318,038 | B2 | 6/2019 | Nathan et al. |
| 10,430,009 | B2 | 10/2019 | Nathan et al. |
| 10,496,210 | B2 | 12/2019 | Nathan et al. |
| 10,739,926 | B2 | 8/2020 | Nathan et al. |
| 10,817,116 | B2 | 10/2020 | Bagheri et al. |
| 11,093,088 | B2 | 8/2021 | Bagheri et al. |
| 2007/0262962 | A1 | 11/2007 | XiaoPing |
| 2009/0146970 | A1 | 6/2009 | Lowles et al. |
| 2010/0079384 | A1 | 4/2010 | Grivna |
| 2010/0085322 | A1* | 4/2010 | Mamba ............... G06F 1/3262 345/173 |
| 2011/0102061 | A1* | 5/2011 | Wang ............... G06F 3/0445 327/517 |
| 2011/0147101 | A1 | 6/2011 | Bateman et al. |
| 2012/0086667 | A1 | 4/2012 | Coni et al. |
| 2012/0268416 | A1 | 10/2012 | Pirogov et al. |
| 2013/0076646 | A1 | 3/2013 | Krah et al. |
| 2013/0176274 | A1 | 7/2013 | Sobel et al. |
| 2013/0265256 | A1 | 10/2013 | Nathan et al. |
| 2014/0008203 | A1 | 1/2014 | Nathan et al. |
| 2014/0013865 | A1 | 1/2014 | White et al. |
| 2014/0043289 | A1 | 2/2014 | Stern |
| 2014/0049892 | A1 | 2/2014 | Huang et al. |
| 2014/0139444 | A1 | 5/2014 | Kauhanen et al. |
| 2015/0168466 | A1 | 6/2015 | Park et al. |
| 2016/0026315 | A1 | 1/2016 | Choi et al. |
| 2016/0098131 | A1 | 4/2016 | Ogata et al. |
| 2016/0117034 | A1 | 4/2016 | Day et al. |
| 2016/0124544 | A1 | 5/2016 | Kang et al. |
| 2016/0179276 | A1 | 6/2016 | Nathan et al. |
| 2016/0306481 | A1 | 10/2016 | Filiz et al. |
| 2017/0153749 | A1 | 6/2017 | Noguchi |
| 2017/0199624 | A1 | 7/2017 | Nathan et al. |
| 2017/0228072 | A1 | 8/2017 | Amin et al. |
| 2017/0262099 | A1 | 9/2017 | Nathan et al. |
| 2017/0371470 | A1 | 12/2017 | Nathan et al. |
| 2018/0143728 | A1 | 5/2018 | Withers et al. |
| 2019/0253053 | A1 | 8/2019 | Nathan et al. |
| 2019/0286263 | A1 | 9/2019 | Bagheri et al. |
| 2019/0050080 | A1 | 11/2019 | Bagheri et al. |
| 2020/0026409 | A1* | 1/2020 | Sagawai ............. G06F 3/04186 |
| 2020/0293132 | A1 | 9/2020 | Nathan et al. |
| 2021/0165550 | A1 | 6/2021 | Astley et al. |

FOREIGN PATENT DOCUMENTS

| | | |
|---|---|---|
| GB | 2533667 A | 6/2016 |
| JP | 2013-131110 A | 7/2013 |
| KR | 20150066885 A | 6/2015 |
| WO | 2009150498 A2 | 12/2009 |
| WO | 2012031564 A1 | 3/2012 |
| WO | 2014045847 A1 | 3/2014 |
| WO | 2014098946 A1 | 6/2014 |
| WO | 2014129083 A1 | 8/2014 |
| WO | 2014192786 A1 | 12/2014 |
| WO | 2015046289 A1 | 4/2015 |
| WO | 2015098725 A1 | 7/2015 |
| WO | 2016102975 A2 | 6/2016 |
| WO | WO-2016102975 A2 * | 6/2016 ........... G06F 3/0446 |
| WO | 2017109455 A1 | 6/2017 |

OTHER PUBLICATIONS

Written Opinion of the International Searching Authority forPCT application PCT/GB2018/052249, dated Oct. 8, 2018, 8 pages.
International Search Report for PCT application PCT/GB2018/052249, dated Oct. 8, 2018, 6 pages.
U.S. Office Action directed to U.S. Appl. No. 14/978,531 by Nathan, et al., USPTO, dated Jun. 20, 2018, 22 pages.
U.S. Office Action directed to U.S. Appl. No. 15/539,038 by Nathan, et al., USPTO, dated Jul. 18, 2018, 27 pages.
U.S. Office Action directed to U.S. Appl. No. 16/534,076 by Nathan, et al., USPTO, dated Dec. 10, 2019, 7 pages.
U.S. Office Action directed to U.S. Appl. No. 16/057,771 by Bagheri, et al., USPTO, dated Jan. 16, 2020, 22 pages.
U.S. Office Action directed to U.S. Appl. No. 16/430,009 by Bagheri, et al., USPTO, dated Sep. 3, 2020, 21 pages.
International Search Report and Written Opinion, directed to International application No. PCT/GB2015/054157, dated Dec. 23, 2015, 7 pages.
Combined Search and Examination Report under Sections 17 and 18(3), directed to GB application GB1512621.2, dated Dec. 21, 2015, 7 pages.
Notice of Allowance in U.S. Appl. No. 16/891,285, USPTO, Sep. 25, 2020, 9 pages.
U.S. Non-final Office Action directed to U.S. Appl. No. 17/263,859 by Astley et al., USPTO, dated Jul. 6, 2021, 19 pages.
Astley, et al. U.S. Appl. No. 17/399,357, filed Aug. 11, 2021, 73 pages.

* cited by examiner

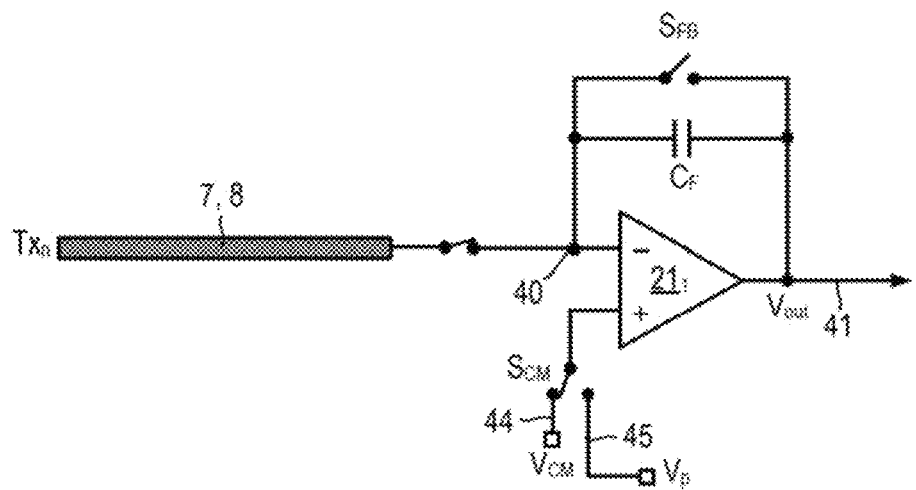
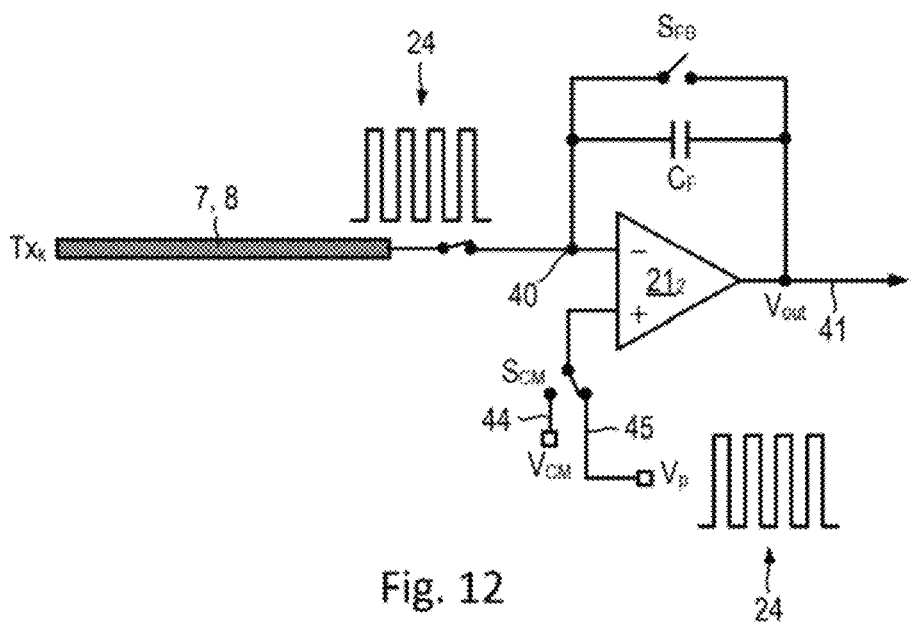
Fig. 12

TOUCH PANEL PRESSURE DETECTION

RELATED APPLICATIONS

This application was originally filed as PCT Application No, PCT/G82018/052249, filed Aug. 7, 2018, which claims priority to United Kingdom Application 1712706.9, filed Aug. 8, 2017, each of which is hereby incorporated by reference.

FIELD OF THE INVENTION

The present invention relates to a touch panel for capacitive and/or pressure sensing.

BACKGROUND

Resistive and capacitive touch panels are used as input devices for computers and mobile devices. One type of capacitive touch panel, projected capacitance touch panels, is often used for mobile devices because an exterior layer may be made of glass, providing a hard surface which is resistant to scratching. An example of a projected capacitance touch panel is described in US 2010/0079384 A1.

Projected capacitance touch panels operate by detecting changes in electric fields caused by the proximity of a conductive object. The location at which a projected capacitance touch panel is touched is often determined using an array or grid of capacitive sensors. Although projected capacitance touch panels can usually differentiate between single-touch events and multi-touch events, they suffer the drawback of not being able to sense pressure. Thus, projected capacitance touch panels tend to be unable to distinguish between a relatively light tap and a relatively heavy press. A touch panel that can sense pressure can allow a user to interact with a device in new ways by providing additional information to simply position of a touch.

Different approaches have been proposed to allow a touch panel to sense pressure. One approach is to provide capacitive sensors which include a gap whose size can be reduced by applied pressure, so as to produce a measureable difference in the mutual capacitance. For example, US 2014/043289 A describes a pressure sensitive capacitive sensor for a digitizer system which includes an interaction surface, at least one sensing layer operable to sense interaction by mutual capacitive sensing, and an additional layer comprising resilient properties and operable to be locally compressed responsive to pressure locally applied during user interaction with the capacitive sensor. However, the need for a measurable displacement can make it more difficult to use a glass touch surface and can cause problems with material fatigue after repeated straining.

Other pressure sensitive touch panels have proposed using one or more discrete force sensors supporting a capacitive touch panel, such that pressure applied to the capacitive touch panel is transferred to one or more sensors located behind the panel or disposed around the periphery. For example, US 2013/0076646 A1 describes using strain gauges with a force sensor interface which can couple to touch circuitry. WO 2012/031564 A1 describes a touch panel including a first panel, a second panel, and a displacement sensor sandwiched between the first panel and the second panel. The displacement sensors, such as capacitive or piezoresistive sensors, are placed around the edge of the second panel. However, it can be difficult to distinguish the pressure of multiple touches using sensors located behind a touch panel or disposed around the periphery.

Other pressure sensitive touch panels have been proposed which attempt to combine capacitive touch sensing with force sensitive piezoelectric layers. For example, WO 2009/150498 A2 describes a device including a first layer, a second layer, a third layer, a capacitive sensing component coupled to the first layer, and a force sensing component coupled to the first layer and the third layer and configured to detect the amount of force applied to the second layer. WO 2015/046289 A1 describes a touch panel formed by stacking a piezoelectric sensor and an electrostatic sensor. The piezoelectric sensor is connected to a pressing force detection signal generation unit, and the electrostatic sensor is connected to a contact detection signal generation unit. However, systems which use separate electrodes and/or separate electronics to sense changes in capacitance and pressures can make a touch panel more bulky and expensive. Systems in which electrodes are directly applied or patterned onto a piezoelectric film can be more complex and expensive to produce.

SUMMARY

The present invention seeks to provide an improved touch controller.

According to a first aspect of the invention there is provided a device including a plurality of first input/output terminals for a projected capacitance touch panel. The projected capacitance touch panel includes a layer of piezoelectric material disposed between a plurality of sensing electrodes and a common electrode. The device includes one or more amplifiers, each amplifier having an inverting input, a non-inverting input and an output. The non-inverting input of the or each amplifier is configured to be switched between a common mode voltage and a capacitance measurement signal. The inverting input of the or each amplifier is configured to drive an input/output terminal based on the capacitance measurement signal. The amplifier is configured such that, when an input/output terminal is connected to a sensing electrode, the amplifier output varies in dependence upon a pressure applied to the touch panel.

Apparatus may include the device and a touch panel. The touch panel may include a layer of piezoelectric material disposed between a plurality of sensing electrodes and a common electrode. Each sensing electrode may be connected to a corresponding input/output terminal.

The touch panel may include a layer structure comprising one or more layers, each layer extending perpendicularly to a thickness direction, the one or more layers including a layer of piezoelectric material, the layer structure having first and second opposite faces, and the layer(s) arranged between the first and second faces such that the thickness direction of each layer is perpendicular to the first and second faces. The touch panel may include a number of first sensing electrodes disposed on the first face. Each first sensing electrode may be connected to a corresponding input/output terminal. The touch panel may include a common electrode disposed on the second face.

According to a second aspect of the invention there is provided a circuit including a number of input/output conductive lines, a number of control input conductive lines, first and second switch conductive lines, an amplifier output conductive line, an amplifier input conductive line, a common mode voltage conductive line, and a capacitance signal conductive line. The circuit also includes an amplifier having inverting and non-inverting inputs and an output. The inverting amplifier input is connected to the amplifier input conductive line and the amplifier output is connected to the output conductive line. The circuit also includes a multiplexer configured to connect the inverting amplifier input to the input/output conductive lines. The multiplexer us configured to connect the inverting amplifier input to one of the input/output conductive lines in dependence upon signals received via the control input conductive lines. The circuit also includes a first switch configured, in response to receiving a signal via the first switch conductive line, to connect the amplifier output to the inverting amplifier input. The circuit also includes a second switch configured, in response to receiving a signal via the second switch conductive line, to connect the non-inverting amplifier input to the common mode voltage conductive line or to connect the non-inverting amplifier input to the capacitance signal conductive line.

Thus, the circuit is configured such that it may be used to drive an electrode of a touch panel through the inverting input of the amplifier, whilst sequentially or simultaneously providing an amplifier output which includes information about a charge generated in the touch panel by a piezoelectric material.

The circuit may further include a decoder configured to control the multiplexer. The decoder may have a first number of inputs and a second number of outputs. Each decoder input may be connected to a corresponding control input conductive line.

Thus, the number of control input conductive lines may be less than the number of input/output conductive lines, making it simpler to establish external connections to the circuit.

A device may include one or more of the circuits. The device may also include a plurality of input/output terminals, each input/output terminal connected to at least one circuit via a respective input/output conductive line. The device may also include one or more amplifier output terminals, each amplifier output terminal connected to the amplifier output conductive line of a corresponding circuit. The device may also include one or more amplifier input terminals, each amplifier input terminal connected to the amplifier input conductive line of a corresponding circuit.

A device may include a controller connected to the control input conductive lines and the first and second switch conductive lines of each circuit. The controller may be configured to control the multiplexer, the first switch and the second switch of each circuit.

The device may include a plurality of control input terminals, each control input terminal connected to a corresponding control input conductive line of a circuit. The device may include a plurality of first switch terminals, each first switch terminal connected to the first switch conductive line of a corresponding circuit. The device may include a plurality of second switch terminals, each second switch terminal connected to the second switch conductive line of a corresponding circuit.

The device may include a common mode voltage terminal connected to the common mode voltage conductive line of each circuit.

The device may include a first group of circuits and a second group of circuits. The capacitance signal conductive line and common mode voltage conductive line of each circuit belonging to the second group may be electrically connected together.

Each input/output conductive line of each circuit belonging to the first group may be connected to the corresponding input/output conductive line of each other circuit belonging to the first group, and may also be connected to an input/output terminal.

Each input/output conductive line of each circuit belonging to the second group may be connected to the corresponding input/output conductive line of each other circuit belonging to the second group, and may also be connected to an input/output terminal.

The controller may be configured to receive a signal and to control the multiplexer, first switch and second switch of each circuit in dependence upon the received signal. The signal for controlling the multiplexer, first switch and second switch of each circuit may be received via a communications port. The communications port may be a serial communications port. The communications port may be a parallel communications port.

The device may include one or more capacitance signal terminals, each capacitance signal terminal connected to one or more circuits via the respective capacitance signal conductive line.

The controller may also be configured to generate a capacitance measurement signal, and to supply the capacitance measurement signal to some or all of the circuits via respective capacitance signal conductive lines. A capacitance measurement signal may be a time-varying period voltage signal. A capacitance measurement signal may have a sinusoidal, triangular, square, pulsed, top-hat or saw-toothed waveform.

The device may include one or more low pass filters configured to filter signals output by the amplifier or amplifiers.

The device may include an analog-to-digital converter configured to digitise signals output from the amplifier or amplifiers. The analog-to-digital converter may be configured to digitise signals filtered by the low-pass filter or filters.

The capacitance measurement signal may be a time-varying period voltage signal which is equal to a ground potential at least once per period. The device may include an analog-to-digital converter configured to sample signals output from the amplifier or amplifiers at times corresponding to zero amplitude of a capacitance measurement signal.

Apparatus may include the device, one or more capacitors and a touch panel. The touch panel may include a layer of piezoelectric material disposed between a plurality of sensing electrodes and a common electrode. Each sensing electrode may be connected to a corresponding input/output terminal. For each circuit, one of the capacitors may be connected between the amplifier output conductive line and the amplifier input conductive line.

The touch panel may include a layer structure which includes one or more layers, each layer extending perpendicularly to a thickness direction, the one or more layers including the layer of piezoelectric material, the layer structure having first and second opposite faces, and the layer(s) arranged between the first and second faces such that the thickness direction of each layer is perpendicular to the first and second faces. The touch panel may also include a number of first electrodes disposed on the first face. Each first electrode may be connected to a corresponding input/output terminal. The touch panel may also include a common electrode disposed on the second face.

The common electrode may include a region of conductive material arranged in a grid.

The first electrodes may include a plurality of conductive pads disposed on the first face in an array.

The touch panel may include a number of second electrodes disposed overlying the first face of the layer structure and arranged such that the layer structure is between the plurality of second electrodes and the common electrode. Each of the second electrodes may be connected to a corresponding input/output terminal.

Each first electrode may extend in a first direction and the first electrodes may be arrayed spaced apart perpendicular to the first direction. Each second electrode may extend in a second direction and the second electrodes may be arrayed spaced apart perpendicular to the second direction. The first and second directions may be different.

The touch panel may include a second layer structure which includes one or more dielectric layers, each dielectric layer extending perpendicularly to a thickness direction, the second layer structure having third and fourth opposite faces, the dielectric layers arranged between the third and fourth faces such that the thickness direction of each dielectric layer is perpendicular to the third and fourth faces. The second electrodes may be disposed on the third face of the second layer structure and the fourth face of the second layer structure may contact the plurality of first electrodes.

The second electrodes may be disposed on the first face of the layer structure. Each first electrode may include a continuous conductive region and each second electrode may include a plurality of conductive regions electrically connected to one another by jumpers. Each jumper may span a conductive region forming a portion of one of the first electrodes.

Apparatus may include the device, one or more capacitor, a projected capacitance controller and a touch panel. The touch panel may include a layer structure, the layer structure including one or more layers, each layer extending perpendicularly to a thickness direction, the one or more layers including a layer of piezoelectric material, the layer structure having first and second opposite faces, and the layer(s) arranged between the first and second faces such that the thickness direction of each layer is perpendicular to the first and second faces. The touch panel may also include a plurality of first electrodes disposed on the first face. Each first sensing electrode may be connected to a corresponding input/output terminal of the device. The touch panel may include a common electrode disposed on the second face. The touch panel may include a plurality of second electrodes disposed overlying the first face of the layer structure and arranged such that the layer structure is between the plurality of second electrodes and the common electrode. Each of the second electrodes may be connected to a corresponding input/output terminal. The second electrodes may be connected to the capacitive controller via an impedance network. For each circuit, one of the capacitors may be connected between the amplifier output conductive line and the amplifier input conductive line. The projected capacitance controller may be connected to the capacitance signal terminals of the device and may be configured to provide a capacitance measurement signal to the device via the capacitance signal terminals.

The impedance network may include a capacitance connected between each second electrode and the capacitive controller. The capacitive controller may be a A portable electronic device may include the circuit, the device or the apparatus.

A portable electronic device may include the circuit, the device or the apparatus. The portable electronic device may also include a signal processor arranged to receive the pressure values and/or capacitance values. The signal processor may be configured to employ correlated double sampling methods so as to improve signal to noise ratio of the pressure values and/or capacitance values.

The signal processor may be configured to treat the pressure values and/or the capacitance values as image data.

The portable device may incorporate the touch panel overlying a display screen. The portable device may incorporate the touch panel integrated into a display screen.

According to a third aspect of the invention there is provided a method for a touch panel and an amplifier. The touch panel includes a layer of piezoelectric material disposed between a plurality of first electrodes and at least one second electrode. The amplifier has inverting and non-inverting inputs and an output. The method includes coupling the inverting input of the amplifier to one of the first electrodes. The method also includes supplying a time varying periodic voltage signal to the non-inverting input of the amplifier. The method also includes outputting a filtered signal generated by filtering a signal received from the amplifier output using a low-pass filter. A cut-off frequency of the low-pass filter is less than a frequency of the time varying periodic voltage signal.

The method may include determining a pressure applied to the touch panel based on the filtered signal.

The amplifier may have a capacitance connected between the inverting input and the output. Coupling may mean electrically coupling or electrically connecting.

The at least one second electrode may be a continuous common mode electrode which overlaps at least part of each first electrode. The at least one second electrode may be a plurality of second electrodes.

According to a fourth aspect of the invention there is provided a method for a touch panel and an amplifier. The touch panel includes a layer of piezoelectric material disposed between a plurality of first electrodes and at least one second electrode. The amplifier has inverting and non-inverting inputs and an output. The method includes coupling the inverting input of the amplifier to one of the first electrodes. The method also includes supplying a time varying periodic voltage signal to the non-inverting input of the amplifier. The time varying periodic signal is equal to a ground or common mode potential at least once per period. The method also includes outputting a sampled signal generated by sampling a signal received from the amplifier output once per period of the time varying periodic voltage signal. The time of sampling in each period corresponds to the time varying periodic signal being substantially equal to the ground or common mode potential.

The method may include determining a pressure applied to the touch panel based on the sampled signal.

The amplifier may have a capacitance connected between the inverting input and the output. Coupling may mean electrically coupling or electrically connecting.

The at least one second electrode may be a continuous common mode electrode which overlaps at least part of each first electrode. The at least one second electrode may be a plurality of second electrodes.

According to a fifth aspect of the invention there is provided a method for a touch panel and an amplifier. The touch panel includes a layer of piezoelectric material disposed between a plurality of first electrodes and at least one second electrode. The amplifier has inverting and non-inverting inputs and an output. The method includes coupling the inverting input of the amplifier to one of the first electrodes. The method also includes coupling the non-inverting input of the amplifier to a ground or common mode voltage. The method also includes outputting a signal from the first amplifier output. The method also includes coupling the non-inverting input of the first amplifier to a source which provides a time varying periodic voltage signal.

The method may include determining a pressure applied to the touch panel based on the signal.

The amplifier may have a capacitance connected between the inverting input and the output. Coupling may mean electrically coupling or electrically connecting.

The at least one second electrode may be a continuous common mode electrode which overlaps at least part of each first electrode. The at least one second electrode may be a plurality of second electrodes.

According to a sixth aspect of the invention there is provided a method for a touch panel and first and second amplifiers. The touch panel includes a layer of piezoelectric material disposed between a plurality of first electrodes and at least one second electrode. Each amplifier has inverting and non-inverting inputs and an output. The method includes coupling the inverting input of the first amplifier to a first one of the first electrodes. The method also includes coupling the inverting input of the second amplifier to a second one of the first electrodes. The method also includes coupling the non-inverting input of the first amplifier to a ground or common mode voltage. The method also includes coupling the non-inverting input of the second amplifier to a source which provides a time varying periodic voltage signal. The method also includes outputting a first signal from the first amplifier output. The method also includes coupling the non-inverting input of the second amplifier to the ground or common mode voltage. The method also includes coupling the non-inverting input of the first amplifier to a source which provides a time varying periodic voltage signal. The method also includes outputting a second signal from the second amplifier output.

The method may include determining a pressure applied to the touch panel proximate to the first sensing electrode based on the first signal. The method may include determining a pressure applied to the touch panel proximate to the second sensing electrode based on the second signal.

Each of the first and second amplifiers may have a capacitance connected between the inverting input and the output. Coupling may mean electrically coupling or electrically connecting.

The at least one second electrode may be a continuous common mode electrode which overlaps at least part of each first electrode. The at least one second electrode may be a plurality of second electrodes.

BRIEF DESCRIPTION OF THE DRAWINGS

Certain embodiments of the present invention will now be described, by way of example, with reference to the accompanying drawings in which:

FIGS. 11 and 12 illustrate a third method of combining capacitance and pressure measurements;

DETAILED DESCRIPTION

Figure 1:
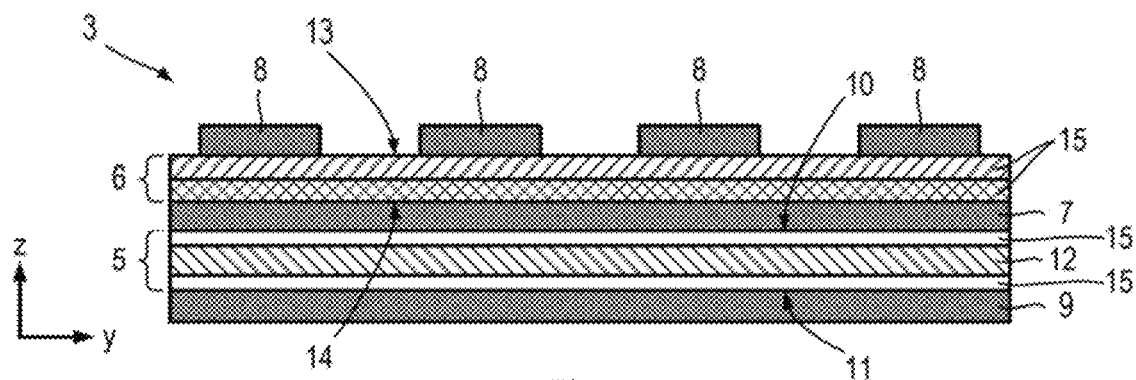
FIG. 1 shows a simplified cross section of a touch panel.

In the following description, like parts are denoted by like reference numerals.

Figure 2:
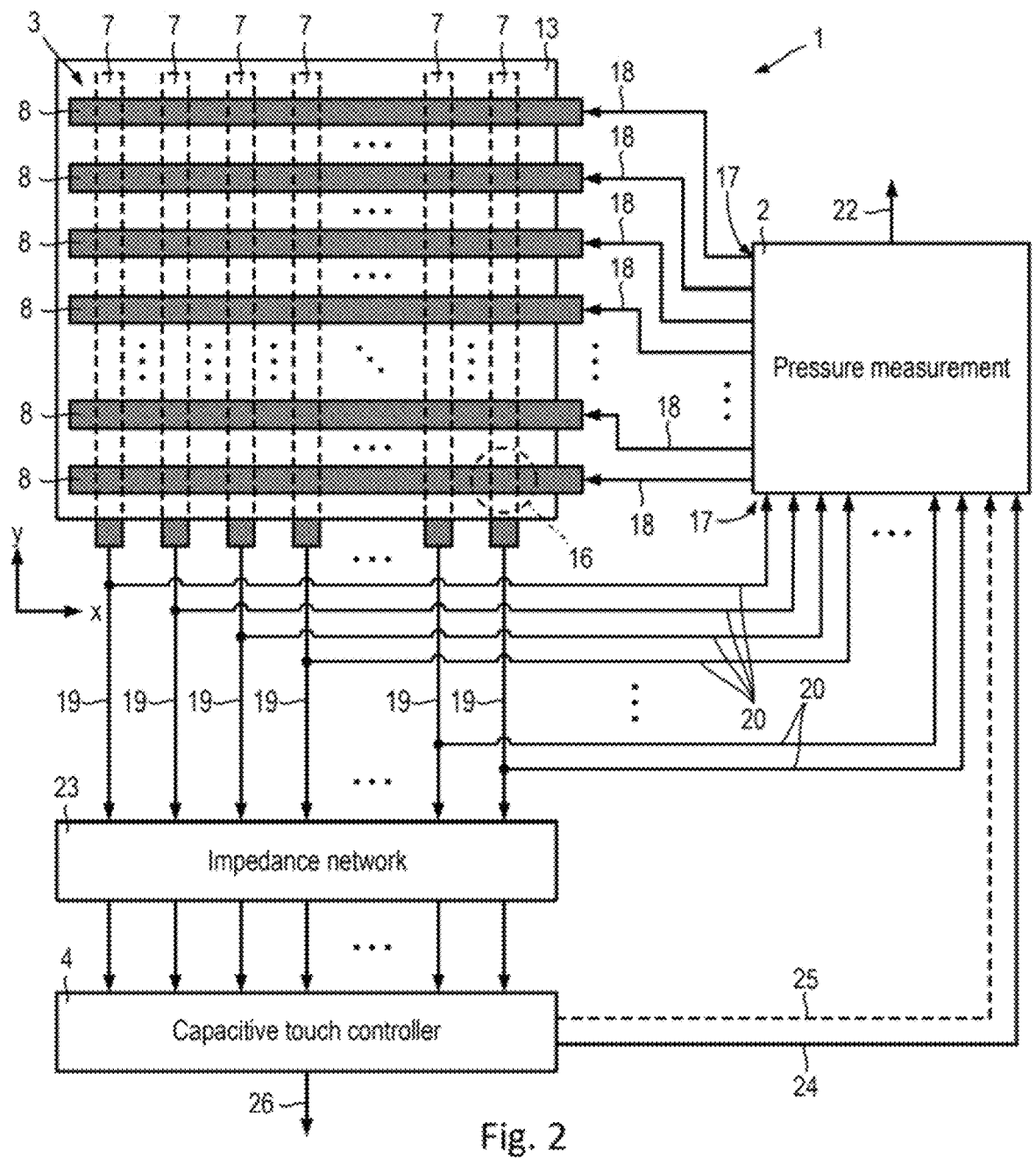
FIG. 2 is a plan view of a touch panel system for combined pressure and capacitance measurements, which includes the touch panel shown in FIG. 1.

Referring to FIGS. 1 and 2, a touch panel system 1 is shown. The touch panel system 1 may be used to measure capacitance values and pressure values resulting from user interactions with the touch panel system 1. Capacitance values and pressure values may be measured either individually, sequentially or concurrently using the touch panel system 1. This functionality is enabled by a device 2 for pressure measurements.

The touch panel system 1 includes a touch panel 3, the device 2 and a capacitive touch controller 4.

A user interaction refers to a user touching or pressing an area of the touch panel 3, or a layer overlying the touch panel 3 such as a cover lens (not shown). A user interaction may involve a user's digit or a stylus (whether conductive or not). A touch interaction may include a user's digit or a conductive stylus being proximate to the touch panel 3 without direct physical contact or without applying significant pressure. A press interaction involves a user pressing the touch panel 3 with sufficient force to cause straining of a layer of piezoelectric material 12 and generation of a piezoelectric response.

Referring in particular to FIG. 1, the touch panel 3 includes first and second layer structures 5, 6, first and second sensing electrodes 7, 8 and a common electrode 9.

The first layer structure 5 has a first face 10 and a second, opposite, face 11. The first layer structure 5 includes one or more layers, including at least a layer of piezoelectric material 12. Each layer included in the first layer structure 5 is generally planar and extends in first and second directions x, y which are perpendicular to a thickness direction z. The one or more layers of the first layer structure 5 are arranged between the first and second faces 10, 11 such that the thickness direction z of each layer of the first layer structure 5 is perpendicular to the first and second faces 10, 11. The first sensing electrodes 7 are disposed on the first face 10 of the first layer structure 5, and the common electrode 9 is disposed on the second face 11 of the first layer structure 5.

The second layer structure 6 has a third face 13 and a fourth, opposite, face 14. The second layer structure 6 includes one or more dielectric layers 15. Each dielectric layer 15 is generally planar and extends in first and second directions x, y which are perpendicular to a thickness direction z. The one or more dielectric layers 15 of the second layer structure 6 are arranged between the third and fourth faces 13, 14 such that the thickness direction z of each dielectric layer 15 of the second layer structure 6 is perpendicular to the third and fourth faces 13, 14. The second sensing electrodes 8 are disposed on the third face 13 of the second layer structure 6, and the fourth face 14 of the second layer structure 6 contacts the first sensing electrodes 7.

The layer of piezoelectric material 12 may be formed from a piezoelectric polymer, for example a suitable fluoropolymer such as polyvinylidene fluoride (PVDF). The first and second electrodes 7, 8 may be formed using indium tin oxide (M) or indium zinc oxide (IZO). The common electrode 9 may be formed from indium tin oxide (ITO) or indium zinc oxide (IZO).

The dielectric layer or layers 15 may be formed from a polymer dielectric material such as polyethylene terephthalate (PET), or from layers of pressure sensitive adhesive (PSA) material.

The first layer structure 5 may include only the layer of piezoelectric material 12, such that the first and second opposite faces 10, 11 are faces of the piezoelectric material layer 12. Alternatively, the first layer structure 5 may include one or more dielectric layers 15 which are stacked between the layer of piezoelectric material 12 and the first face 10 of the first layer structure 5. Additionally or alternatively, the first layer structure 5 may include one or more dielectric layers 15 stacked between the second face n of the first layer structure 5 and the layer of piezoelectric material 12.

The second layer structure 6 may include a single dielectric layer 15, such that the third and fourth opposite faces 13, 14 are faces of a single dielectric layer 15. Alternatively, a second layer structure 6 need not be used, and the second sensing electrodes 8 could be disposed on the first face 10 along with the first sensing electrodes 7 (see FIG. 15).

The touch panel 3 is not limited to the described structures, and the device 2 may be used in conjunction with any projected capacitance touch panel which includes a layer of piezoelectric material disposed between a number of sensing electrodes 7, 8 and a common electrode 9.

Referring in particular to FIG. 2, the first sensing electrodes 7 each extend in the second direction y and the first sensing electrodes 7 are disposed in an array evenly spaced in the first direction x. The second sensing electrodes 8 each extend in the first direction x and the second sensing electrodes 8 are disposed in an array evenly spaced in the second direction y. The common electrode 9 is disposed on the second face n and is extensive such that the common electrode 9 at least partially underlies each of the first and second sensing electrodes 7, 8. The common electrode 9 may be substantially coextensive with the second face n of the first layer structure 5. In this way, each intersection 16 of a first sensing electrode 7 with a second sensing electrode 8 effectively provides a touch sensor.

The device 2 includes a number of input/output terminals 17 (herein see also Tx$_n$, Rx$_m$ in FIG. 13) for connecting to the touch panel 3. Each second electrode 8 is connected to a corresponding input/output terminal 17 using a first conductive line 18 (also referred to herein as a "conductive trace"). Each first electrode 7 is connected to a corresponding second conductive line 19, and each second conductive line 19 is connected to a corresponding input/output terminal 17 using a third conductive line 20.

Figure 4:
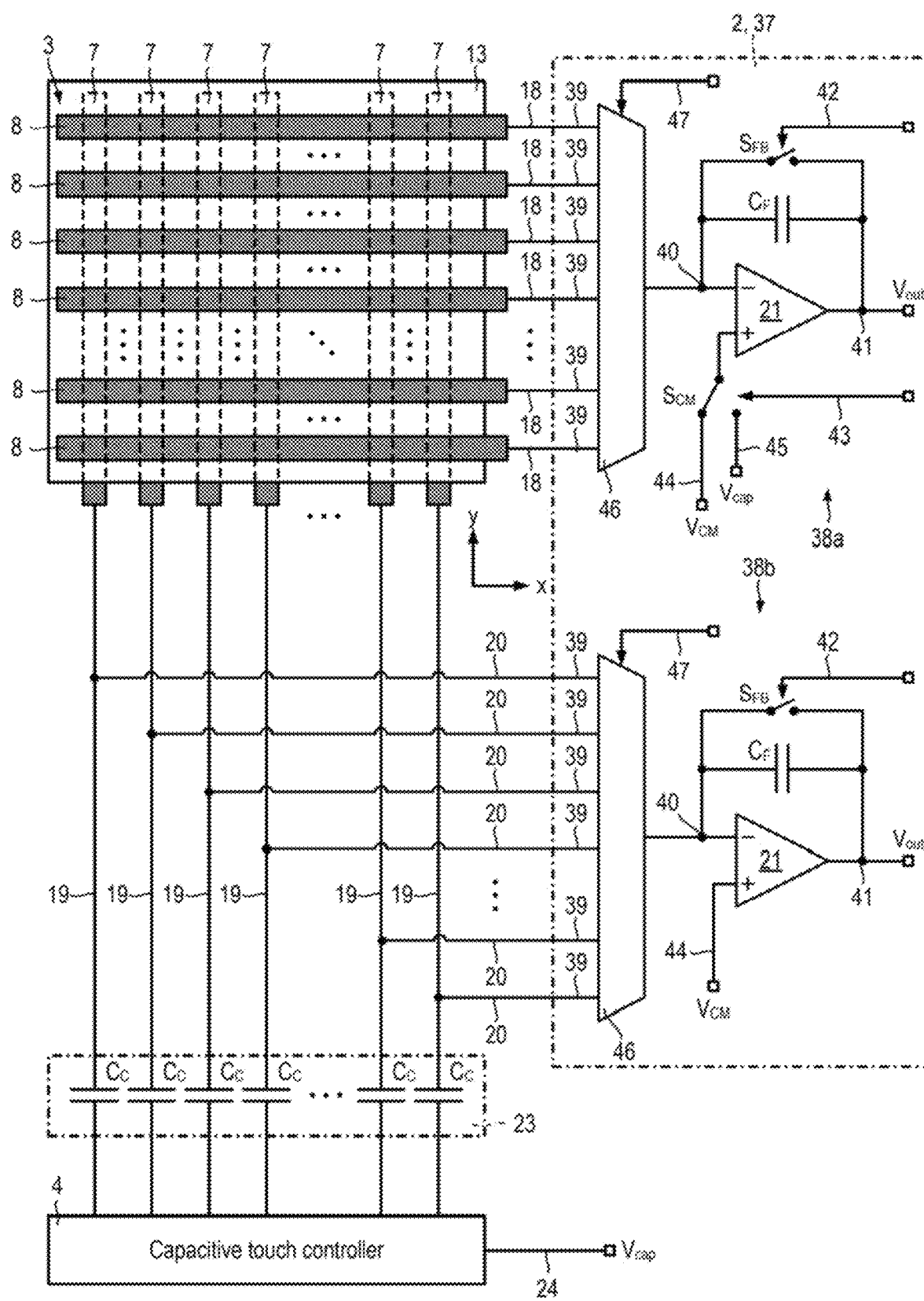
FIG. 4 is a simplified circuit diagram for a first example of a device for use in the touch panel system shown in FIG. 2.

The device 2 includes one or more amplifiers 21 (FIG. 4). Each amplifier 21 (FIG. 4) has an inverting input, a non-inverting input and an output. The non-inverting input of the or each amplifier 21 (FIG. 4) is configured to be switched between a common mode voltage and a capacitance measurement signal 24. The inverting input of the or each amplifier 21 (FIG. 4) is configured to drive an input/output terminal 17 based on the capacitance measurement signal 24. The device may include an amplifier 21 (FIG. 4) corresponding to each input/output terminal 17. Preferably, each amplifier 21 (FIG. 4) may drive a selected input/output terminal 17 selected from amongst the input/output terminals 17 using a multiplexer 46 (FIG. 4). The or each amplifier 21 (FIG. 4) is configured to produce an output signal in response to pressure being applied to the touch panel 3 proximate to an electrodes 7, 8 to which the amplifier 21 (FIG. 4) is connected via an input/output terminal and conductive lines 18, 19, 20.

The capacitance measurement signal 24 may be for mutual capacitance measurements or self-capacitance measurements. The capacitance measurement signal 24 is a time varying periodic voltage signal $V_{cap}(t)$. The common mode voltage is a DC bias voltage, and may be equal to a system ground potential.

Pressure signals 22 which are output by the device 2 may be directly output from the or each amplifier 21 (FIG. 4). The device 2 may filter and/or digitise the pressure signals 22 before output. In some examples the device 2 may include a controller 59 (FIG. 13) to control addressing of electrodes 7, 8 and function of the amplifiers 21 (FIG. 4). The controller 59 (FIG. 13) may optionally process the amplifier outputs and the pressure signals 22 output from the device 2 may correspond to pressure values.

The capacitive touch controller 4 includes a number of capacitance measurement terminals, each of which is coupled to a corresponding second conductive line 19 via an impedance network 23. The capacitive touch controller 4 is, in general, a conventional capacitive touch controller for self- or mutual-capacitance measurements. For example, the capacitive touch controller 4 may be a commercially available touch controller such as a Microchip® MTCH6303 capacitive touch controller. The capacitive touch controller 4 outputs a capacitance measurement signal 24 to the device 2. The capacitive touch controller 4 may additionally output control signals 25 to the device 2 in order to identify which electrodes 7, 8 should be addressed. Alternatively, the device 2 and the capacitive touch controller 4 may be externally coordinated by a controller 59 (FIG. 13) or synchronisation timer (not shown).

The mutual capacitance of an intersection 16 may be measured as follows. The device 2 connects the non-inverting input of a first amplifier 21 (FIG. 4) to the capacitance measurement signal 24 received from the capacitive touch controller 4. The device 2 also connects the inverting input of the first amplifier 21 (FIG. 4) to a second electrode 8 corresponding to the intersection 16 via the respective input/output terminal 17 and first conductive line 18. The amplifier 21 (FIG. 4) drives the connected second electrode 8 as a transmission, or Tx, electrode. The first electrode 7 corresponding to the intersection 16 acts as a receiver, or Rx, electrode which receives an induced signal which is induced by driving the second electrode 8 corresponding to the intersection 16 with the capacitance measurement signal. The capacitive touch controller 4 receives the induced signal from the first electrode 7 via the respective capacitance measurement terminal, second conductive line 19 and the impedance network 23. Based on differences between the capacitance measurement signal 24 and the induced signal, the capacitive touch controller 4 calculates a mutual capacitance between the first and second electrodes 7, 8 corresponding to the intersection. In this way, the intersections 16 between the first and second electrodes 7, 8 may be scanned to measure a mutual capacitance corresponding to each intersection 16. The capacitive touch controller 4 provides an output in the form of capacitance values 26.

Either concurrently or alternately with capacitance measurements, the device 2 may measure a pressure applied proximate to the first and second electrodes 7, 8 corresponding to each intersection 16. For example, a first amplifier 21 (FIG. 4) driving the second electrode 8 may also measure a pressure applied proximate to the second electrode 8. A second amplifier 21 (FIG. 4) may be connected to the first electrode 7 to measure a pressure applied proximate to the first electrode 7. The second amplifier 21 (FIG. 4) is connected to the first electrode 7 by a third conductive line 20 which is electrically connected to the corresponding second conductive line 19 at a point between the impedance network 23 and the first electrode 7. Examples of concurrent and alternating capacitance and pressure measurements are set out by the first, second and third methods of combining pressure and capacitance measurements described hereinafter.

Although the first and second electrodes 7, 8 have been depicted as being substantially rectangular, other shapes can be used. The touch panel 3 may be bonded overlying a display 27 (FIG. 3) of an electronic device 28 (FIG. 3), and a cover lens (not shown) may be bonded overlying the touch panel 3 to protect the outermost electrodes, e.g. the second electrodes 8.

Figure 20:
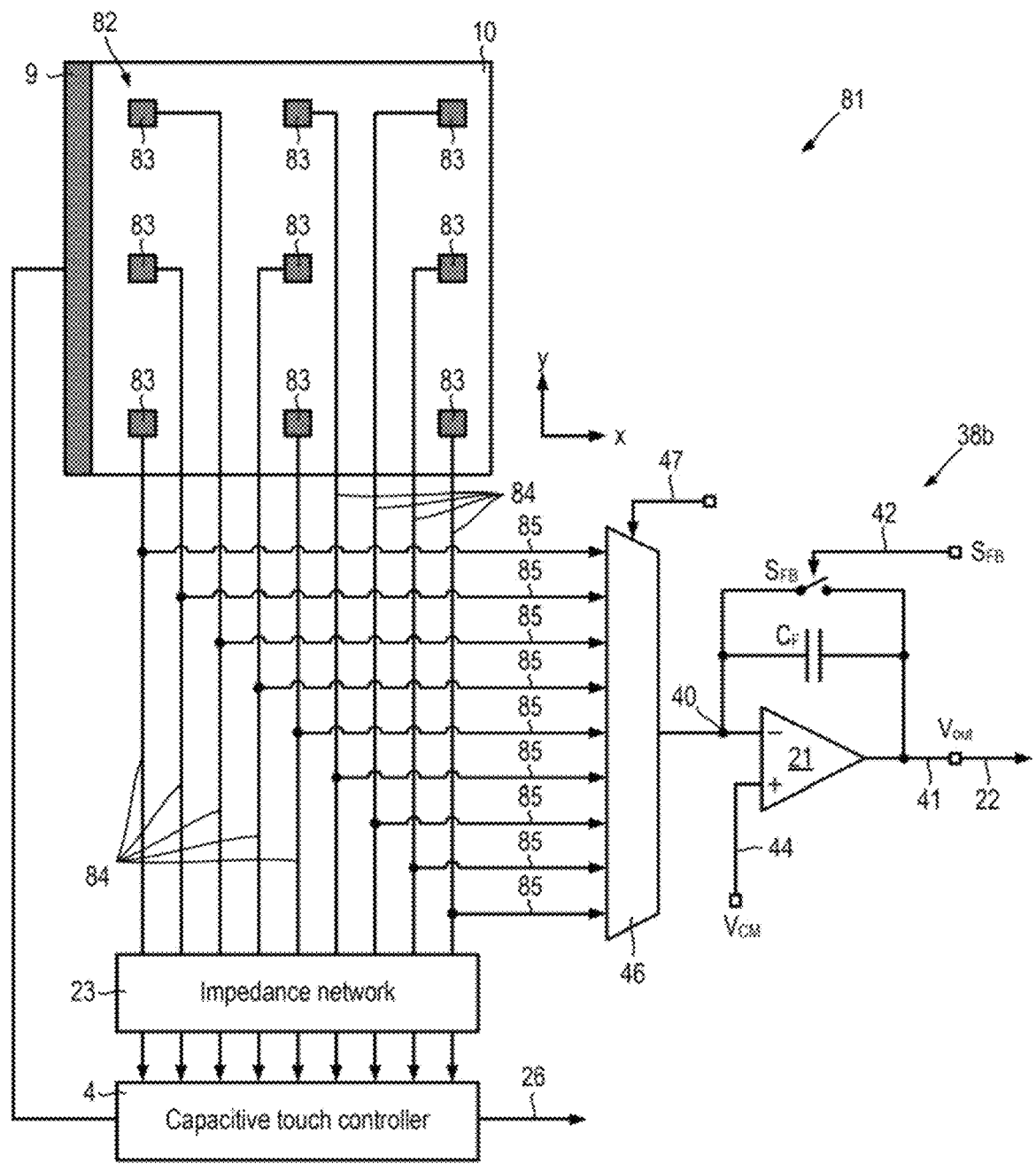
FIG. 20 is a plan view of a third touch panel system for combined pressure and capacitance measurements.

The second electrodes 8 need not be connected as transmission electrodes Tx and the first electrodes 7 need not be connected as receiving electrodes Rx. Instead, the first electrode 7 may be connected as transmission electrodes Tx and the second electrodes 8 may be connected as receiving electrodes Rx The device 2 is not limited to mutual capacitance measurements, and in other examples, the self-capacitance of electrodes 7, 8 may be measured instead (FIG. 20).

The device 2 is preferably provided as a discrete element or module, for example as a packaged integrated circuit with the input/output terminals 17 taking the form of physical terminals for attachment to a printed circuit board or similar substrate. The capacitive touch controller 4 may be provided by a separate element, for example as a separate integrated circuit.

Figure 13:
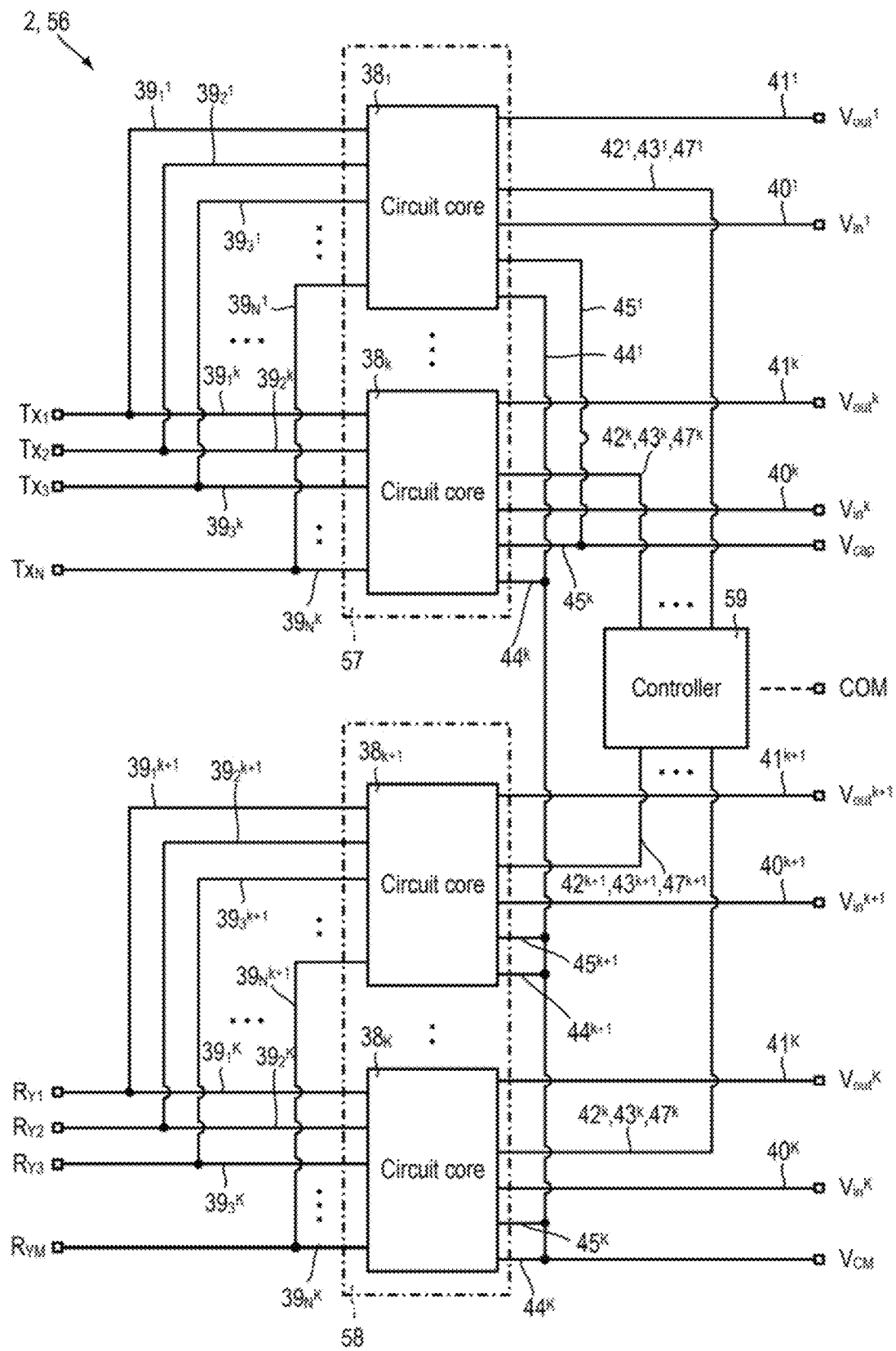
FIG. 13 is a schematic of a second example device for use in the touch panel system shown in FIG. 2.

Signal processing of the pressure signal 22 may be provided by the device 2, for example using a controller 59 (FIG. 13). Alternatively, signal processing of the pressure signal 22 may be provided by the processor 29 (FIG. 3) of an electronic device 28 (FIG. 3) incorporating the touch panel system 1.

An advantage of the touch panel system 1 including the device 2 for pressure measurement is to allow capacitance and pressure measurements to be made using conventional capacitive touch controllers 4 without the need for additional electrodes or a fundamental re-design of the internal circuitry of a capacitive touch controller. The device 2 enables existing projected capacitive touch panel systems to be augmented with pressure information with minimal modification.

However, the touch panel system 1 does not need to be implemented using a separate capacitive touch controller 4. Alternatively, the functionality of the device 2 for pressure measurement and a capacitive touch controller 4 may be integrated into a single element, for example, a single packaged integrated circuit for connection to the 2 touch panel 3 (see FIG. 18). In this way, a single package solution may be provided for combined pressure and capacitance measurements of a touch panel.

Figure 3:
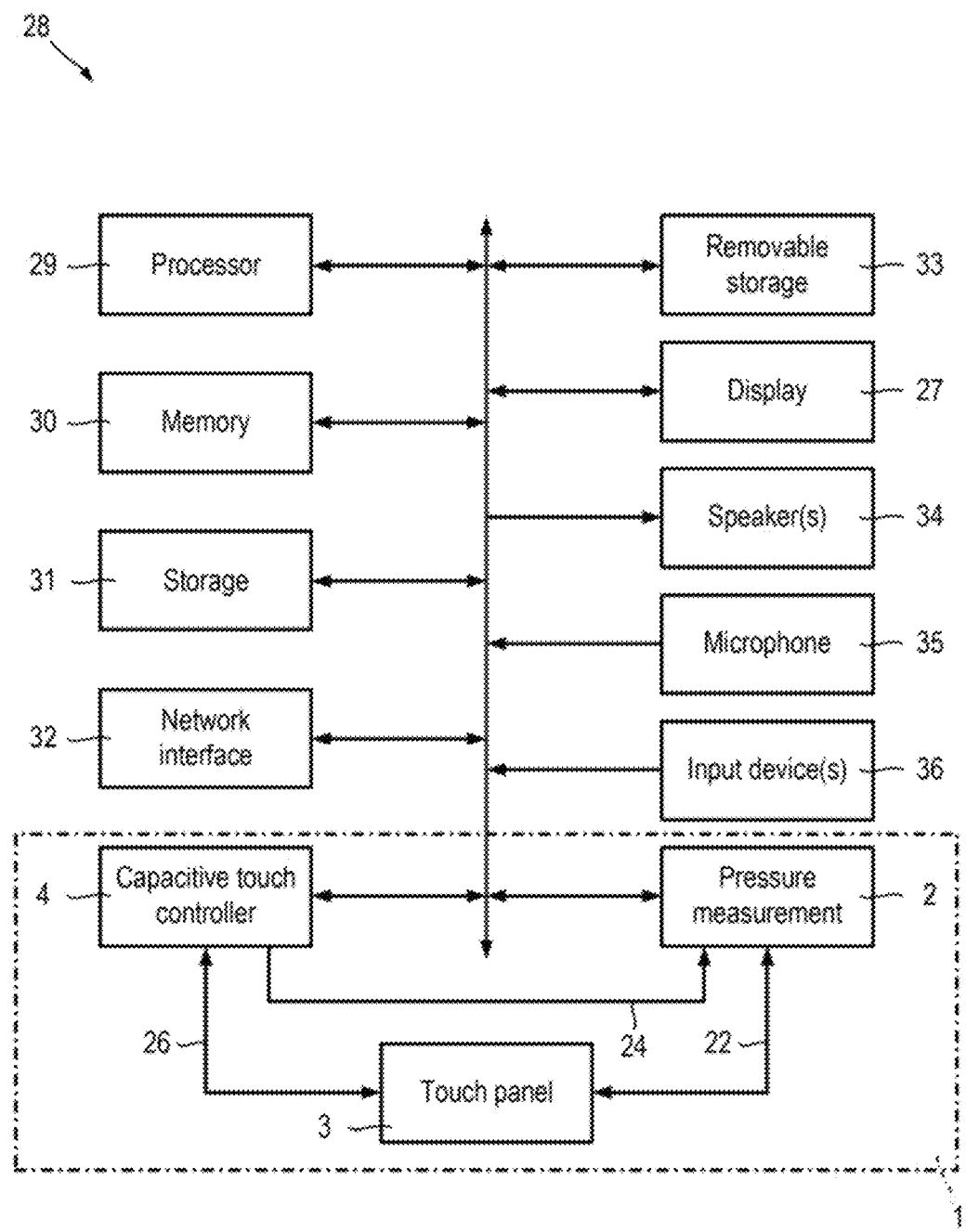
FIG. 3 is a schematic block diagram of an electronic device incorporating the touch panel system for combined pressure and capacitance measurements.

FIG. 3 shows a block diagram of an electronic device 28 incorporating the touch panel system 1 for combined pressure and capacitance measurements.

Referring also to FIG. 3, an electronic device 28 may include a touch panel 3, a capacitive touch controller 4 and a device 2 for pressure measurements.

The electronic device 28 may be a relatively immobile electronic device such as, for example a desktop computer, an automated teller machine (ATM), a vending machine, a point of sale device, or a public access information terminal. Alternatively, an electronic device 28 may be a portable electronic device such as a laptop, notebook or tablet computer, a mobile phone, a smart phone, a personal data assistant, a music playing device, or a vehicle such as a car. The preceding lists are not exhaustive. The electronic device 28 includes a touch panel 3. The touch panel 3 is coupled to a device 2 for pressure measurements and a capacitive touch controller 4.

The electronic device 28 may include a processor 29 for executing programs and processing information. The electronic device 28 may include a memory 30 such as a volatile random access memory for temporarily storing programs and information, and/or storage 31 such as non-volatile random access memory (NVRAM) or a hard disc drive (HDD) for long term storage of programs and information. The electronic device 28 may include a network interface 32 for transmitting and/or receiving information from wired or wireless communication networks (not shown). The electronic device 28 may include a removable storage interface 33 which can interface with removable storage media (not shown) to read and/or write programs and information. The electronic device 28 may include output means such as, for example, a display 27 and/or speaker(s) 34. The display 27 may be any type of display such as, for example, a liquid crystal display (LCD), a light emitting diode display (LED), an organic LED display, an electrophoretic display or other type of electronic-ink display.

The capacitive touch controller 4 provides input information to the electronic device 28 in the form of capacitance values 26. The processor 29 receives the capacitance values 26 and determines the locations of one or more user interactions with the touch panel 3 in dependence on the capacitance values 26 received. Alternatively, the capacitive touch controller 4 may process capacitance values 26 internally and may output processed data such as the location of one or more user touches to the processor 29 or other elements of the electronic device 28.

Similarly, the device 2 for pressure measurement provides input information to the electronic device 28 in the form of pressure signals 22. The pressure signals 22 may be processed by the processor 29 to determine the locations and corresponding forces of one or more user touches. Alternatively, the device 2 for pressure measurements may process the pressure signals 22 to determine the locations and corresponding forces of one or more user touches, and the locations and corresponding forces may be output to the processor 29 or other elements of the electronic device 28.

The capacitive touch controller 4 and device 2 for pressure measurement may be provided as separate elements, for example as separate packaged integrated circuits. Alternatively, the capacitive touch controller 4 and device 2 for pressure measurement may be provided as a single, integrated element, for example, a single packaged integrated circuit.

The electronic device 28 may include other input means such as a microphone 35, and/or other input devices 36 such as, for example, a keyboard, keypad, mouse or trackball.

In dependence on the capacitance values 26 and pressure signals 22, the processor 29 (or the capacitive touch controller 4 and device 2 for pressure measurements respectively) may provide positional information in the form of coordinates and/or pressures corresponding to one or more simultaneous user interactions with the touch panel 3.

The touch panel 3 may be provided overlying the display 27. Alternatively, the elements of the touch panel 3 such as the first and second electrodes 7, 8 and the piezoelectric material layer 12 may be integrated into or embedded within the display 27. When the touch panel 3 is used overlying or integrated into the display 27, the layer structure(s) 5, 6 and electrodes 7, 8, 9 may be transparent or substantially transparent. For example, the layer structure(s) 5, 6 and electrodes 7, 8, 9 may transmit 50% or more, preferably at least 75%, or preferably at least 90% of light in visible wavelengths. For example, the piezoelectric material layer 12 may be a suitable fluoropolymer such as PVDF, dielectric layers 15 included in the layer structures 5, 6 may be PET or an optically clear PSA, and the electrodes 7, 8, 9 may be ITO.

The electronic device 28 may include a hardware or software signal processor (not shown) which is arranged to receive the pressure signals 22 and/or capacitance values 26. The signal processor (not shown) may be configured to employ correlated double sampling methods so as to improve signal to noise ratio of the pressure signals 22 and/or capacitance values 26. The signal processor (not shown) may be configured to treat the pressure values and/or the capacitance values as image data.

Example of a Touch Panel System

Referring also to FIG. 4, a touch panel system t is shown which includes a device 2 in the form of a first exemplary device 37.

The first exemplary device 37 includes a first circuit core 38a arranged to drive the second electrodes 8 for capacitance measurements and to output pressure signals 22, $V_{out}$, corresponding to the second electrodes 8. The first exemplary device 37 includes a second circuit core 38b arranged to output pressure signals 22, $V_{out}$, corresponding to the first electrodes 7 without interfering with the reception of induced signals by the capacitive touch controller 4.

The first circuit core 38a includes a number of input/output conductive lines 39, each of which is coupled to a corresponding second electrode 8 via one of the first conductive lines 18. The first circuit core 38a includes an amplifier 21 having inverting and non-inverting inputs and an output. The inverting input of the amplifier 21 is connected to an amplifier input conductive line 40, and the output of the amplifier 21 is connected to an output conductive line 41.

The amplifier 21 may take the form of an operational amplifier. The amplifier 21 is preferably a high gain amplifier having rail-to-rail input and a high capacitive drive capability.

The first circuit core 38a includes a first switch $S_{FB}$ (also referred to herein as a "feedback reset" switch) configured, in response to receiving a control signal via a first switch conductive line 42, to connect the output conductive line 41 to the amplifier input conductive line 40. A feedback capacitor $C_F$ connects between the output conductive line 41 and the amplifier input conductive line 40. The feedback capacitor $C_F$ may be part of the first circuit core 38a, but is preferably provided by a separate, external capacitance connected to the first circuit core 38a. The function of the reset switch $S_{FB}$ is to discharge the feedback capacitor $C_F$ as well as to reset the electrodes 7, 8 to the common mode voltage $V_{CM}$.

The first circuit core 38a includes a second switch $S_{CM}$ configured, in response to receiving a control signal via a second switch conductive line 43, to connect the non-inverting input of the amplifier 21 to a common mode voltage conductive line 44 or to connect the non-inverting input of the amplifier 21 to a capacitance signal conductive line 45. The common mode voltage conductive line 44 is connected to a DC bias source VC. The capacitance signal conductive line 45 is connected to the capacitive touch controller 4 to receive a capacitance measurement signal 24 in the form of time varying periodic voltage signal $V_{cap}(t)$.

The first circuit core 38a includes a multiplexer 46 configured to connect the amplifier input conductive line 40 to the input/output conductive lines 39 associated with the first circuit core 38a. The multiplexer 46 is configured to connect the amplifier input conductive line 40 to one of the input/output conductive lines 39 in dependence upon signals received via one or more control input conductive lines 47.

The second circuit core 38b includes a number of input/output conductive lines 39, each of which is coupled to a corresponding first electrode 7 via one of the third conductive lines 20, which is in turn connected to one of the second conductive lines 19 at a point between the corresponding first electrode 7 and the impedance network 23. The second circuit core 38b includes an amplifier 21 having inverting and non-inverting inputs and an output. The inverting input of the amplifier 21 is connected to an amplifier input conductive line 40, and the output of the amplifier 21 is connected to an output conductive line 41.

The second circuit core 38b includes a first, feedback reset switch $S_{FB}$ configured, in response to receiving a control via a first switch conductive line 42, to connect the output conductive line 41 to the amplifier input conductive line 40. A feedback capacitor $C_F$ connects between the output conductive line 41 and the amplifier input conductive line 40. The feedback capacitor $C_F$ may be part of the second circuit core 38b, but is preferably provided by a separate, external capacitance connected to the second circuit core 38b. The function of the reset switch $S_{FB}$ is to discharge the feedback capacitor $C_F$ as well as to reset the electrodes 7, 8 to the common mode voltage $V_{CM}$.

The second circuit core 38b need not include the second switch $S_{CM}$, and the non-inverting input of the amplifier 21 is connected to a common mode voltage conductive line 44 in the second circuit core 38b. The common mode voltage conductive line 44 is connected to the DC bias source $V_{CM}$.

The second circuit core 38b includes a multiplexer 46 configured to connect the amplifier input conductive line 40 to the input/output conductive lines 39 associated with the second circuit core 38b. The multiplexer 46 is configured to connect the amplifier input conductive line 40 to one of the input/output conductive lines 39 in dependence upon signals received via one or more control input conductive lines 47.

The impedance network 23 may be provided by a coupling capacitance $C_C$ which connects each second conductive line 19 to a capacitance measurement terminal of the capacitive touch controller 4. The coupling capacitance $C_C$ provides AC coupling to the first electrodes 7, which removes the bias to common mode voltage introduced by connecting the amplifier 21 of the second circuit core 38b to the first electrodes 7.

The common electrode 9 is connected to the DC bias source $V_{CM}$.

Each intersection 16 of the first and second electrodes 7, 8 may be individually addressed using the multiplexers 46 of the first and second circuit cores 38a, 38b. Through synchronisation of the multiplexers 46 and the first and second switches $S_{FB}$, $S_{CM}$, capacitance and pressure information may be obtained by scanning each intersection 16 of the first and second electrodes 7, 8 according to a sequence which may be either predetermined and repetitive, or dynamically determined using compressive sensing techniques. For example, low resolution scans may address a subset of intersections 16 to determine an approximate location of a user interaction, followed by addressing every intersection surrounding the approximate location of the user interaction in order to determine an accurate location of the user interaction.

Control signals to the control input conductive lines 47 and first and second switch control lines 42, 43 may be provided by a controller 59 (FIG. 13), for example in the form of a field programmable gate array, which may optionally be included in the first exemplary device 37. Control signals may be based on information received from the capacitive touch controller 4. In other examples, the capacitive touch controller 4 and the device 2, 37 for pressure measurement may be synchronised and controlled by an external element such as, for example, the processor 29 of an electronic device 28. In this latter case, control signals to the control input conductive lines 47 and first and second switch control lines 42, 43 are provided by the external element.

The first circuit core 38a is used for driving second electrodes 8 as transmission, or Tx electrodes for mutual capacitance measurements. The second circuit core 38b can be connected to first electrodes 7 being used as receiving, or Rx lines for mutual capacitance measurements, without interfering with the capacitance measurements.

Although FIGS. 1 and 4 show the second electrodes 8 in the role of the driven, or transmission Tx electrodes, the roles of the first and second electrodes 7, 8 need not be fixed and alternatively the first electrodes 7 may act as transmission electrodes Tx and the second electrodes 8 may act as receiving electrodes Rx.

Conductive lines 18, 19, 20, 39, 40, 41, 42, 43, 44, 45, 47 may take the form of wires, tapes or deposits of conductive material. For example, conductive lines 39, 40, 41, 42, 43, 44, 45, 47 may be formed by evaporation or sputtering of conductive materials. Alternatively, conductive lines 39, 40, 41, 42, 43, 44, 45, 47 may be formed by etching a uniform layer of conductive material. Conductive lines 39, 40, 41, 42, 43, 44, 45, 47 may be formed by printing. Conductive lines 39, 40, 41, 42, 43, 44, 45, 47 may take the form of metallic materials such as copper, aluminium, silver, gold and so forth. Conductive lines 39, 40, 41, 42, 43, 44, 45, 47 may take the form of metallised regions of a semiconducting material. Conductive lines 39, 40, 41, 42, 43, 44, 45, 47 may include two or more segments which are electrically conductive, and each segment may be formed of a different material and/or using a different fabrication method.

The first and second circuit cores 38a, 38b are similar and a single, common circuit core 38 may be used to provide either or both.

Figure 5:
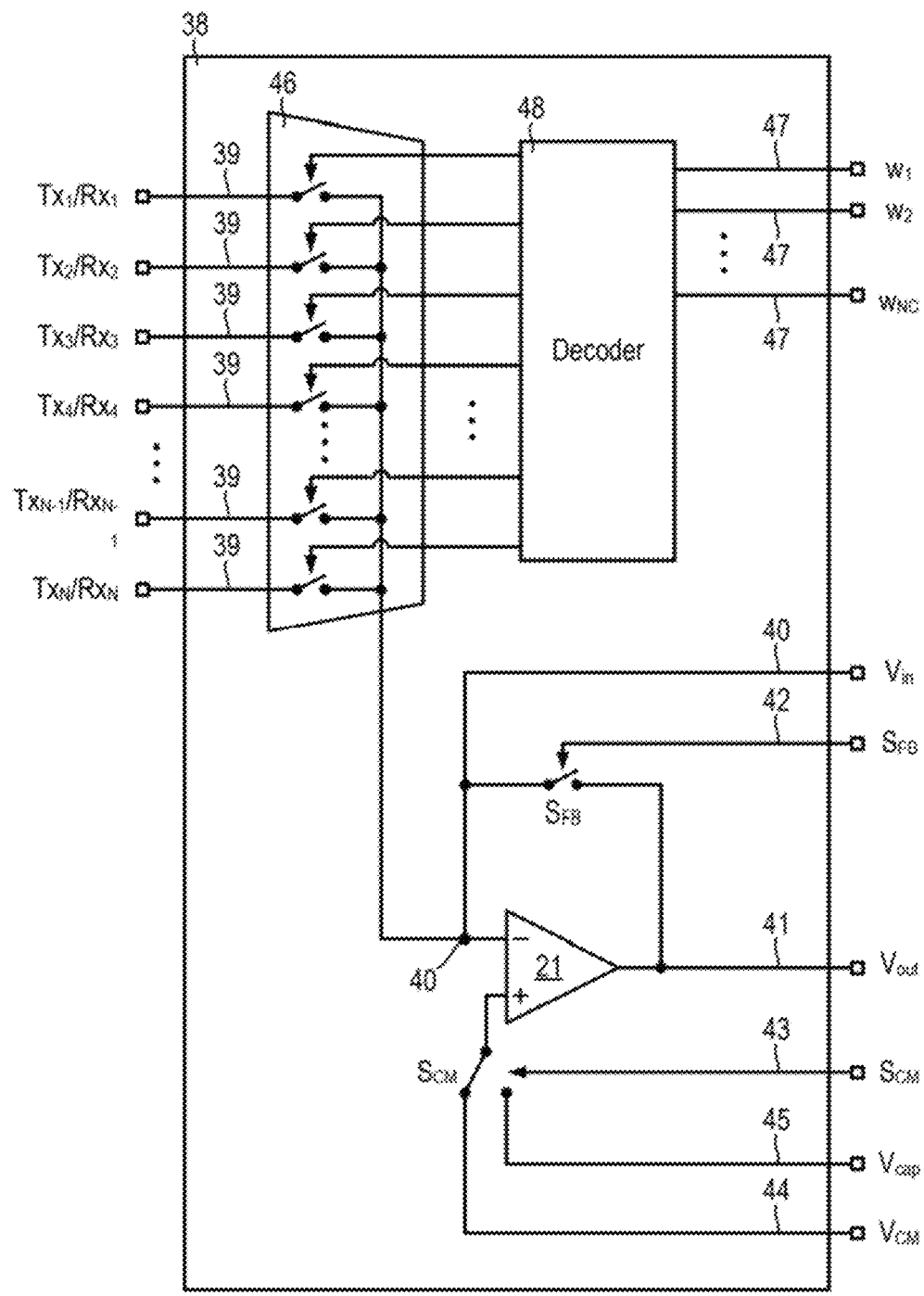
FIG. 5 a simplified circuit diagram for a common circuit core for use in the touch panel system shown in FIG. 2.

Referring also to FIG. 5, an example of a common circuit core 38 suitable for providing either a first or second circuit core 38a, 38b is shown.

The common circuit core 38 includes an amplifier 21 having inverting and non-inverting inputs and an output. The inverting input of the amplifier 21 is connected to an amplifier input conductive line 40, and the output of the amplifier 21 is connected to an output conductive line 41. The inverting input of the amplifier 21 is also connected to a number, N, of input/output conductive lines 39 through a multiplexer 46. The individual switches of the multiplexer 47 are controlled by a decoder 48. The decoder 48 receives inputs from a number, NC, of control input conductive lines 47 which is less than the number N of input/output conductive lines 39, i.e. NC<N. The decoder 48 includes an output for controlling each switch of the multiplexer 46 and is an NC to N decoder. The decoder 48 is not essential to the operation of the common circuit core 38, and may be omitted so that NC=N. The decoder 48 may be useful for reducing the number of control input conductive lines 47 needed to control the multiplexer 46.

The amplifier 21 is preferably a high gain amplifier having rail-to-rail input and a high capacitive drive capability. The amplifier 21 is preferably an operational amplifier.

The common circuit core 38 includes a first switch $S_{FB}$ configured, in response to receiving a control signal via a first switch conductive line 42, to connect the output conductive line 41 to the amplifier input conductive line 40. The feedback capacitor $C_F$ is not part of the common circuit core 38, and an external feedback capacitor $C_F$ may be used to connect between the output conductive line 41 and the amplifier input conductive line 40. The function of the reset switch $S_{FB}$ is to discharge the feedback capacitor $C_F$ as well as to reset the electrodes 7, 8 to the common mode voltage, i.e. to the DC bias source $V_{CM}$.

The common circuit core 38 includes a second switch $S_{CM}$ configured, in response to receiving a control signal via a second switch conductive line 43, to connect the non-inverting input of the amplifier 21 to a common mode voltage conductive line 44 or to connect the non-inverting input of the amplifier 21 to a capacitance signal conductive line 45.

A device 2, 37 for pressure measurement may include one or more of the common circuit cores 38. For example, the first exemplary device 37 may include a common circuit core 38 which is configured to provide the first circuit core 38a by connecting each input/out conductive line 39 to a corresponding second electrode 8 via a first conductive line 18, and by connecting a feedback capacitor $C_{FB}$ between the amplifier input conductive line 40 and the output conductive line 41.

The first exemplary device 37 may include a common circuit core 38 which is configured to provide a second circuit core 38b by connecting each input/out conductive line 39 to a corresponding first electrode 7 via second and third conductive lines 19, 20, and by connecting a feedback capacitor $C_{FB}$ between the amplifier input conductive line 40 and the output conductive line 41. For the common circuit core 38 providing a second circuit core 38b, the capacitance signal conductive line 45 is not connected to the capacitive touch controller 4 to receive the capacitance measurement signal 24, and the capacitance signal conductive line 45 is instead connected to the common mode voltage conductive line 44.

Preferably, multiple common circuit cores 38 are included in a device 2, 37 packaged as an integrated circuit. Such a packaged integrated circuit may include only the common circuit cores 38, or may additionally include one or more other elements such as a controller 59 (FIG. 1), a filter 52 (FIG. 8), an analog-to-digital converter 53 (FIG. 8), a module 79 providing the functions of a capacitive touch controller 4 and/or an impedance network 23

Alternatively, the common circuit core 38 itself may be provided as a packaged integrated circuit in which each of the N input/output conductive lines 39 is electrically connected to a corresponding input/output terminal $Tx_1/Rx_1, \ldots, Tx_N/Rx_N$ for connection to electrodes 7, 8 of a touch panel 3. Similarly, each of the NC control input conductive lines 47 may be electrically connected to a corresponding control input terminal $w_1, \ldots, w_{NC}$. The first switch conductive line 42 may be connected to a feedback switching terminal $S_{FB}$. The second switch conductive line 43 may be connected to a common mode switching terminal $S_{CM}$. The amplifier input conductive line 40 may be connected to an amplifier input terminal $V_{in}$. The output conductive line 41 may be connected to an output terminal $V_{out}$ for extracting pressure signals 22. The common mode voltage conductive line 44 may be connected to a common mode voltage terminal for connection to a DC bias voltage source $V_{CM}$. The capacitance signal conductive line 45 may be connected to a capacitance signal terminal for receiving the capacitance measurement signal 24 in the form of a periodic time varying voltage signal $V_{cap}$. If provided as a packaged integrated circuit, the common circuit core 38 may include additional terminals for connection to, for example, power supply rails, system ground and so forth.

Operating Principles of the Device for Pressure Measurements

Without wishing to be bound by theory, the operating principles of the device 2, 37 for pressure measurements are briefly explained with reference also to FIGS. 6, 7 and 8.

Figure 6:
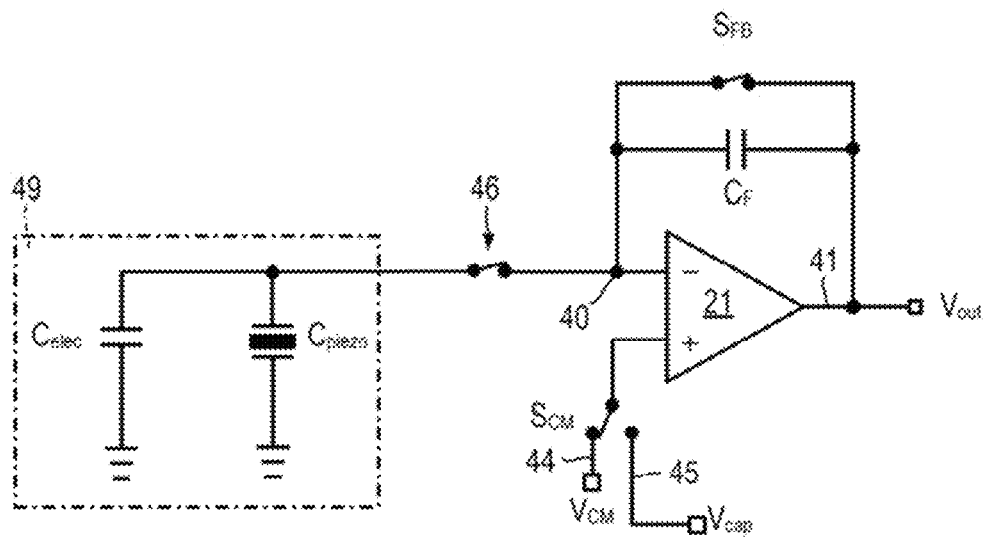
FIGS. 6,7 and 8 illustrate the operating principles of the device shown in FIG. 4.

Referring in particular the FIG. 6, the feedback capacitor $C_{FB}$ is reset by closing the first, or feedback switch $S_{FB}$ to discharge the feedback capacitor $C_{FB}$. Additionally, the non-inverting input of the amplifier 21 is connected to the common mode voltage $V_{CM}$ by the second, or common mode switch $S_{CM}$. Because the inverting input of the amplifier 21 is at essentially the same voltage as the non-inverting input, this also resets an electrode 7, 8 currently connected to the amplifier 21 via the multiplexer to the common mode voltage $V_{CM}$. The touch panel 3 and the electrode 7, 8 connected to the amplifier 21 are represented in FIG. 6 by an equivalent circuit 49. The equivalent circuit 49 includes an electrode capacitance $C_{elec}$ connected in parallel with a piezoelectric element $C_{piezo}$. The electrode capacitance $C_{elec}$ represents the capacitance which a particular touch panel system has been set up to measure, which may be either a self-capacitance of an electrode 7, 8 or a mutual-capacitance between a pair of electrodes 7, 8.

Figure 7:
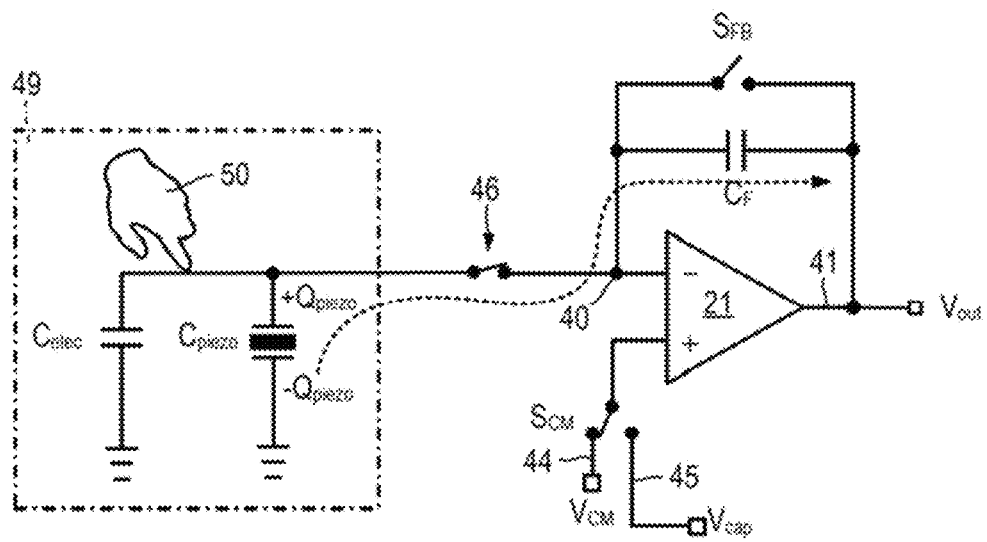

Referring in particular to FIG. 7, after the reset operation, the feedback switch $S_{FB}$ is opened. Subsequently, if the electrode is touched by a user's hand 50 or other object such as a stylus (whether or not conductive), then a charge $Q_{piezo}$ generated by the layer of piezoelectric material 12 embedded in the touch panel 3 is immediately transferred onto the feedback capacitor $C_F$. This is because current cannot flow (or at least only negligible current can flow) into the inverting input of the amplifier 21.

The layer of piezoelectric material 12 embedded in the touch panel 3 is poled such that the layer of piezoelectric material 12 becomes polarised with a polarisation P in response to straining caused by a user interaction which applies force. The polarisation P of the layer of piezoelectric material results in the corresponding charge $Q_{piezo}$ being developed between the common electrode 9 and the first and second electrodes 7, 8. The layer of piezoelectric material 12 should be arranged and poled such that the charge $Q_{piezo}$ developed in response to a typical user interaction is sufficient to produce a detectable response at a location proximate to the user interaction. The straining which produces the polarisation P may result from a compression or a tension. The straining which produces the polarisation P may be an in-plane stretching of the piezoelectric material layer 12. Intimate contact between the layer of piezoelectric material 12 and the electrodes 7, 8 is not required. Generally, a greater straining of the layer of piezoelectric material 12 (caused by a more forceful user interaction) will result in a greater polarisation P, and a correspondingly larger magnitude of the charge $Q_{piezo}$.

Figure 8:
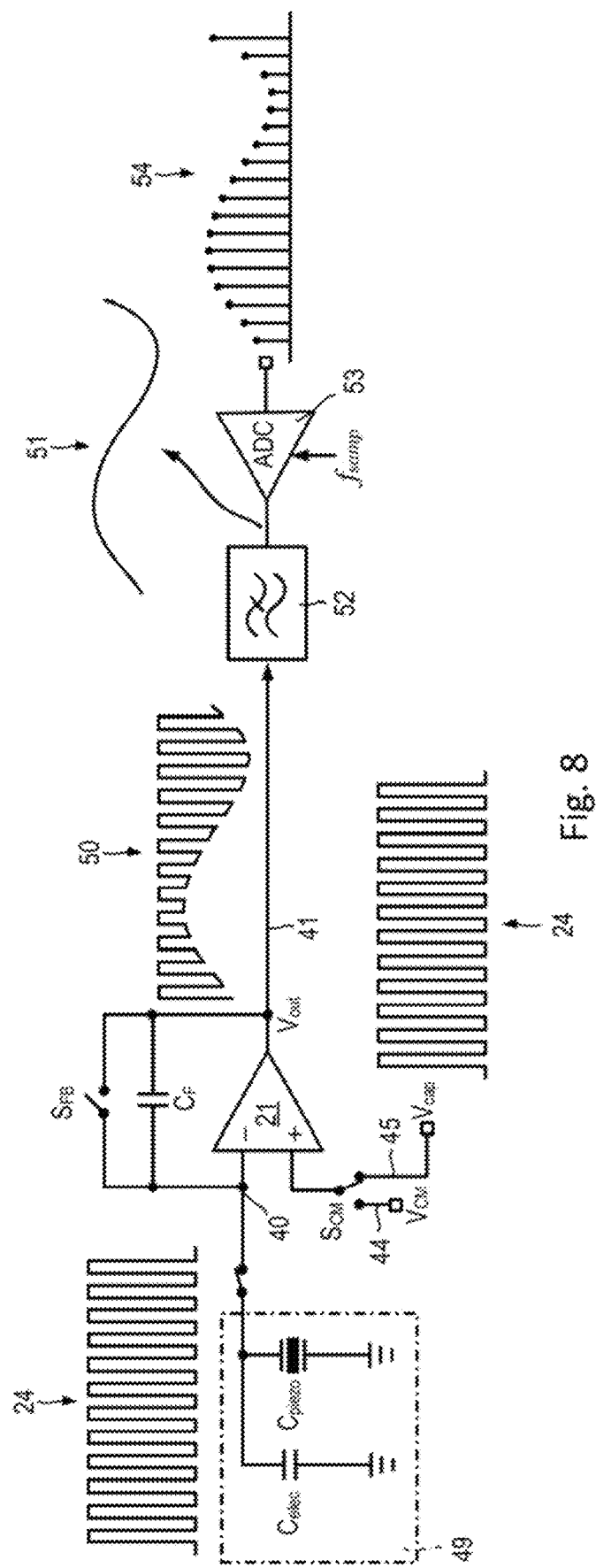

Referring in particular to FIG. 8, if the non-inverting input of the amplifier 21 is subsequently connected to the capacitance measurement signal 24 in the form of time varying voltage signal $V_{cap}(t)$, the charge information stored onto the feedback capacitor $C_F$ in response to a user interaction is not altered or disturbed. The output of the amplifier 21, namely a composite signal 50 in the form of a time varying voltage signal $V_{out}(t)$, in which the relatively high frequency component corresponding to the capacitance measurement signal 24 are modulated by a relatively lower frequency envelope resulting from the charge $Q_{piezo}$ generated by the layer of piezoelectric material 12.

An analog pressure signal 51 can be recovered by applying a low-pass filter 52 to the composite signal 50 to remove the capacitance measurement signal 24. The analog pressure signal 51 can be sampled by an analog-to-digital converter (ADC) 53 at a sampling frequency $f_{samp}$ to generate a digital pressure signal 54 which may be further processed in the digital domain.

The separation of the capacitance measurements signal 24 and analog pressure signal Si is possible because the frequency bandwidth of the analog pressure signal 51 typically spans a frequency bandwidth which may be significantly below the frequency bandwidth of a capacitance measurements signals 24. The capacitance measurement signal 24 may typically be selected to have a basic frequency of greater than or equal to 10 kHz, greater than or equal to 20 kHz, greater than or equal to 50 kHz, greater than or equal to 100 kHz or up to 500 kHz. The capacitance measurement signal 24 may include multiple frequency components, such as, for example, step, square or triangular waveforms, or may be provided with a narrow frequency band or even a single frequency signal, such as a sinusoidal signal.

By contrast, the analog pressure signal 51 corresponding to the piezoelectric response typically includes a broadband frequency content spanning a range from several Hz to several hundreds or thousands of Hz. For example, the analog pressure signal 51 may include frequency components between 1 Hz and 1 kHz. This is partly because the piezoelectric response) arises from user interactions by a human user, and partly because a time constant for decay of the charge $Q_{piezo}$ is relatively long.

The pressure signal 22 output from the device 2, 37 for pressure measurement may be any one of the composite signal 50, the analog pressure signal 51 or the digital pressure signal 54. The device 2, 37 for pressure measurement may include a low pass filter 52 and/or an ADC 53 as required.

Alternatively, the composite signal so output from the amplifier 21 may be directly converted to a digital signal, with filtering being performed in the digital domain, at the expense of using a higher sampling frequency $f_{samp}$.

First Method of Combining Capacitance and Pressure Measurements

Figure 9:
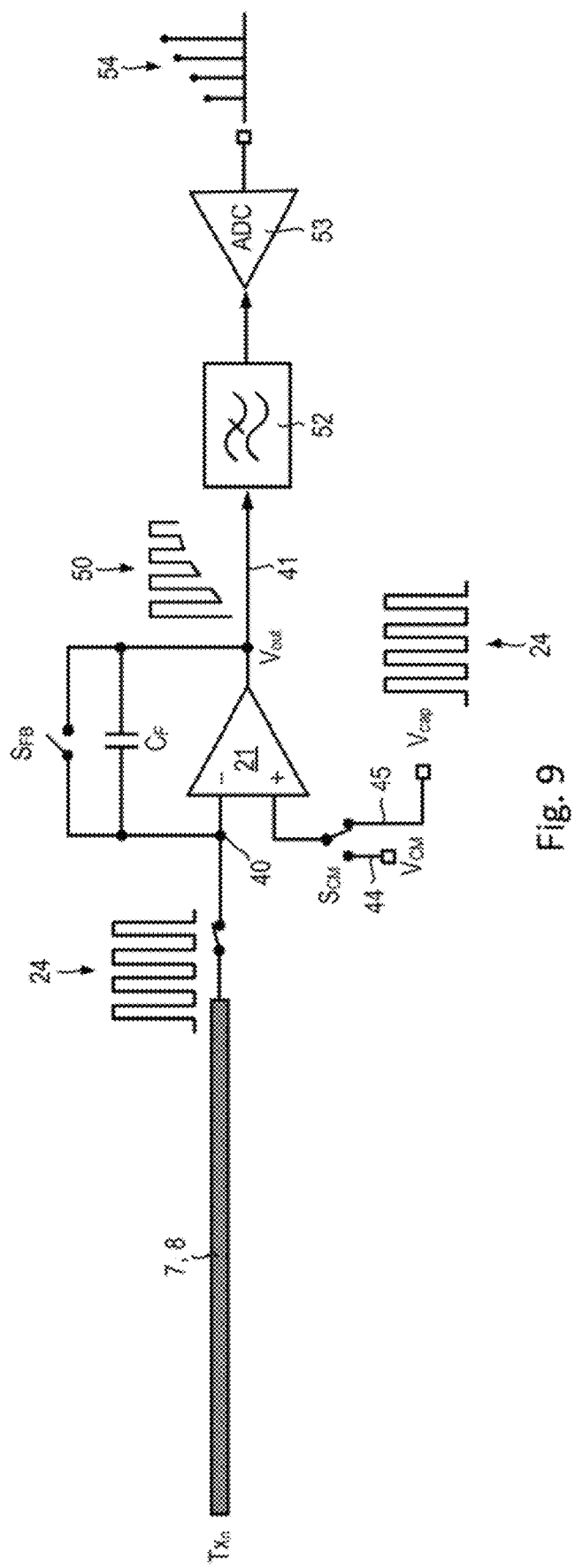
FIG. 9 illustrates a first method of combining capacitance and pressure measurements.

Referring also to FIG. 9, a first method of combining capacitance and pressure measurements using the device 2, 37 for pressure measurements is illustrated.

A first method of combining capacitance and pressure measurements is substantially as described in relation to FIG. 6 to 8. A first or second electrode 7, 8 to be driven as an $n^{th}$ transmission electrode $Tx_n$ out of N transmission electrodes $Tx_1, \ldots, Tx_n, \ldots, Tx_N$ is connected to the amplifier 21 of a circuit core 38a, 38 through the respective multiplexer 46. The second, or common mode switch $S_{CM}$ connects the non-inverting input of the amplifier 21 to the capacitance measurement signal 24, $V_{cap}(t)$. The inverting input of the amplifier 21 maintains the same voltage as is applied to the non-inverting input and, as a result, the inverting input of the amplifier 21 drives a first or second electrode 7, 8 acting as a transmission electrode $Tx_n$.

As explained hereinbefore, charge $Q_{piezo}$ generated in response to user interactions is transferred onto the feedback capacitor $C_F$, which is preferable an external capacitance connected to the circuit core 38a, 38. The composite signal 50 is output from the output of the amplifier 21, and the analog pressure signal 51 recovered by a low-pass filter 52 before sampling by an ADC 53 to generate the digital pressure signal 54.

A corresponding electrode 7, 8 acts as a receiving, or Rx electrode out of M receiving electrodes $Rx_1, \ldots, Rx_m, \ldots, Rx_M$ receives the induced signal and the capacitive touch controller 4 determines a capacitance associated with the intersection 16 of the electrodes 7, 8 which act as transmission and receiving electrodes $Tx_n$, $Rx_m$. A circuit core 38b, 38 connected to the electrode 7, 8 which acts as receiving electrode $Rx_m$ by the respective multiplexer 46 outputs a composite signal 50 corresponding to the electrode 7, 8 which acts as receiving electrode $Rx_m$. Such a composite signal 50 is similarly filtered and digitised. The receiving electrodes Rx are provided by whichever of the first and second electrodes 7, 8 is not driven as transmission electrodes Tx.

In this way, capacitance and piezoelectric pressure measurements covering the entire touch panel 3 may be concurrently obtained by scanning through the intersections 16 using the multiplexers 46. The feedback capacitor $C_F$ is reset by closing the first switch $S_{FB}$ between measuring one electrode 7, 8 and measuring the next in electrode in sequence. Electrodes 7, 8 may be periodically reset to the common mode DC bias voltage $V_{CM}$, for example once each electrode 7, 8 has been read, the electrodes 7, 8 are reset by connection to the common mode voltage VCM before the measurement sequence starts over.

The low-pass filter 52 is preferably capable of separating a signal having a frequency in the range of a few tens of kilo Hertz from a signal of around 100 kHz.

Second Method of Combining Capacitance and Pressure Measurements

The first method uses a low-pass filter 52. However, the touch panel system 1 or an electronic device 28 including the touch panel system 1, does not need to include a low-pass filter 52.

Figure 10:
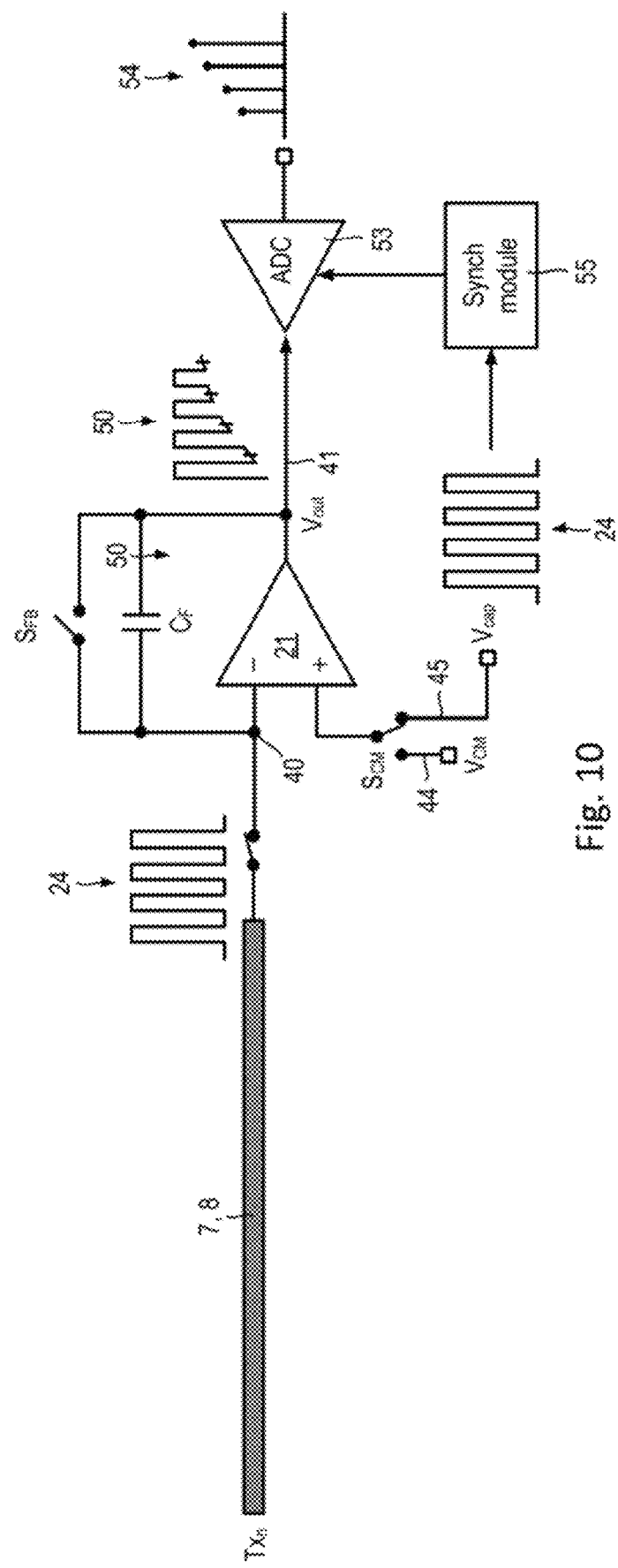
FIG. 10 illustrates a second method of combining capacitance and pressure measurements.

For example, referring also FIG. 10, a second method of combining capacitance and pressure measurements which does not use a low-pass filter 52 is illustrated.

The second method uses the same touch panel 3 connected to the same circuit cores 38a, 38b, 38 in the same way as for the first method. The difference is that the second method processes the composite signal 21 output from the amplifier(s) 21 without using a low-pass filter 53.

Instead, the second method uses an ADC 53 which samples the composite signal 50 at times when the capacitance measurement signal 24 in the form of periodic time varying voltage signal $V_{cap}(t)$ is zero or negligible. In other words, the sampling clock for the ADC is synchronised with zeros of the capacitance measurement signal 24 in the form of periodic time varying voltage signal $V_{cap}(t)$. For example, a synch module 55 may receive the capacitance measurement signal 24 in the form of periodic time varying voltage signal $V_{cap}(t)$ and generate a timing signal for the ADC 53 based on the zeros of the periodic time varying voltage signal $V_{cap}(t)$.

Alternatively, a single, external timing source (not shown) may provide a clock signal to both the ADC 53 and the capacitive touch controller 4 so that the ADC 53 and capacitance measurement signal 24 may be synchronised.

In this way, a low-pass filter 52 is not required in order to extract the digital pressure signal 54. A low-pass filter 52 having suitable performance, whether active or passive, may be relatively more bulky then the components needed to synchronise the ADC 53 and capacitance measurement signal 24, $V_{cap}(t)$. Thus, a touch panel system 1 which may perform concurrent pressure and capacitance measurements may be made more compact.

Third Method of Combining Capacitance and Pressure Measurements

The first and second methods concern concurrent measurements of pressure and capacitance of an electrode 7, 8 using a single amplifier.

Figure 11:
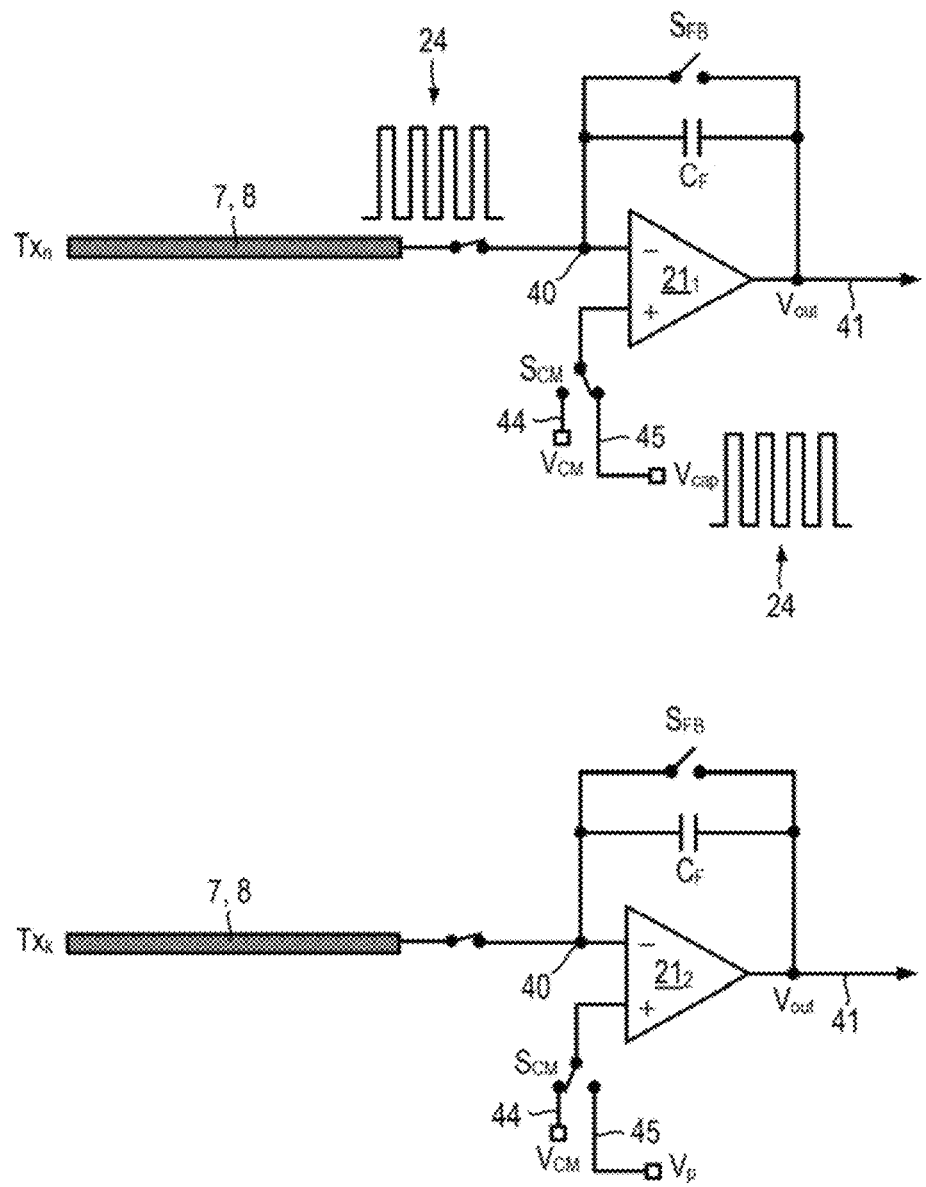

Referring also to FIGS. 11 and 12, a third method utilises two or more circuit cores 38a, 38 to measure pressure and capacitance sequentially.

A first amplifier 21, is included in one circuit core 38a, 38 and a second amplifier $21_2$ is included in another circuit core 38a, 38. The pair of circuit cores 38a, 38 may be physically implemented in a single integrated circuit. The first amplifier $21_1$ is connected to one electrode 7, 8 which acts as a transmission electrode $Tx_n$, via the respective multiplexer 46. The second amplifier $21_2$ is connected to another electrode 7, 8 which acts as another, different transmission electrode $Tx_k$, via the respective multiplexer. There are a number, N, of transmission electrodes in total, provided by the first electrodes 7 or second electrodes 8. The electrodes 7, 8 not acting as transmission electrodes $Tx_1, \ldots, Tx_n, \ldots, Tx_k, \ldots, Tx_N$ act as a second number, M, of receiving electrodes $Rx_1, \ldots, Rx_m, \ldots, Rx_M$. The number N of transmission electrodes Tx may be equal to the number M of receiving electrodes Rx, however the numbers N, M need not be equal.

Referring in particular to FIG. 11, in a first stage of the third method, the non-inverting input of the first amplifier $21_1$ is connected to the capacitance signal conductive line 45 by the respective second, common mode switch $S_{CM}$. The first amplifier $21_1$ receives the capacitance measurement signal 24, $V_{cap}(t)$ into the non-inverting input. The inverting input of the first amplifier $21_1$ is at the same voltage as the non-inverting input and tracks the capacitance measurement signal 24, $V_{cap}(t)$ to drive the connected transmission electrode $Tx_n$. The capacitive touch controller 4 monitors a receiving electrode $Rx_m$, to measure the mutual capacitance of the corresponding intersection 16. Although the first amplifier $21_1$ may output a composite signal 50 via the output conductive line 41, any such signal is not used or recorded.

Simultaneously, the non-inverting input of the second amplifier $21_2$ is connected to the common mode conductive line 44 by the respective second, common mode switch $S_{CM}$, so that the second amplifier 21 receives the common mode voltage, $V_{CM}$ into the non-inverting input. In this way, the second amplifier 21 outputs an analog pressure signal 51 for the connected transmission electrode $Tx_k$ which does not require filtering or synchronised sampling.

Referring in particular to FIG. 12, in a second stage of the third method, the roles of the first and second amplifiers $21_1$, $21_2$ can be interchanged. In this way, the first amplifier $21_1$ is used to read-out a pressure signal 51 from the connected electrode 7, 8 acting as a transmission electrode $Tx_n$ and the second amplifier $21_2$ is driven to measure a capacitance of an intersection 16 with an electrode 7, 8 acting as a receiving electrode $Rx_m$. The corresponding electrode 7, 8 acting as receiving electrode $Rx_m$ for capacitance measurements using first and second amplifiers $21_1$, $21_2$ may be the same or different. Pressure measurements corresponding to electrodes 7, 8 acting as receiving electrodes $Rx_m$ may be read-out during the first and/or second stage of the third method.

In this way, pressure and capacitance measurements corresponding to each electrode 7, 8 may be measured separately according to a sequence. The pressure and capacitance measurements corresponding to a single electrode 7, 8 or an intersection 16 of electrodes 7, 8 may be measured directly one after the other. Alternatively, there may be a longer gap between pressure and capacitance measurements corresponding to a single electrode 7, 8 or an intersection 16 of electrodes 7, 8.

In the third method, when an electrode 7, 8 is pressed which is not connected to any amplifier 21, the pressed electrode 7, 8 floats (as an equipotential) in the electric field induced by straining the layer of piezoelectric material 12 until that electrode 7, 8 is connected to an amplifier 21. Once connected to an amplifier, charge $Q_{piezo}$ flows onto the pressed electrode 7, 8 (and onto the capacitor $C_F$) to cancel the potential difference between the pressed electrode 7, 8 and common mode voltage $V_{CM}$. This requires that the electrode 7, 8 is still pressed and the layer of piezoelectric material 12 strained when the pressed electrode 7, 8 is connected to the amplifier 21. The scan rate of the touch panel 3, for example 30 Hz or higher, should provide a scan interval which is substantially faster than a typical duration of a user interaction.

One example sequence for electrode 7, 8 measurements according to the third method is to discharge $C_F$ and connect the amplifier 21 non-inverting input to the common mode voltage $V_{CM}$. Next, the amplifier 21 inverting input is connected to a given transmission Tx electrode 7, 8 to read-out any piezo charge $Q_{piezo}$ corresponding to that electrode 7, 8 and obtain the corresponding pressure signal 22. Next, the amplifier 21 non-inverting input is connected to the capacitance measurement signal $V_{cap}(t)$. For each receiving Rx electrode 7, 8 intersecting the transmitting Tx electrode 7, 8, the corresponding pressure signals 22 are read in sequence, and then the mutual capacitances of the transmitting Tx electrode and each intersecting receiving Rx electrode 7, 8 are read in sequence. This procedure may be repeated for the next transmission Tx electrode, and so forth until the entire touch panel 3 has been measured for both pressure signals 22 and capacitance values 26.

Device for Pressure Measurement Including Multiple Circuit Cores

Referring also to FIG. 13, a device 2 in the form of second example device 56 for pressure measurement may include multiple common circuit cores 38 to enable use of the hereinbefore described third method and/or shorter scan times to measure all the electrodes of a touch panel 3.

The second example device 56 may take the form of a packaged integrated circuit having a first number N of input/output terminals $Tx_1, \ldots, Tx_m, \ldots, Tx_M$ for connection to a corresponding number of electrodes 7, 8 of a touch panel 3 via first conductive lines 18. Either the first electrodes 7 or the second electrodes 8 of a touch panel 3 may be connected to the terminals $Tx_1, \ldots, Tx_n, \ldots, Tx_M$ so as to function as transmission electrodes for capacitance measurements. The second example device 56 also includes a second number M of input/output terminals $Rx_1, \ldots, Rx_m, \ldots, Rx_M$ for connection to a corresponding number of electrodes 7, 8 of a touch panel 3 via second and third conductive lines 19, 20. If the first number N of input/output terminals $Tx_1, \ldots, Tx_n, \ldots, Tx_N$ are connected to the first electrodes 7, then the second number M of input/output terminals $Rx_1, \ldots, Rx_m, \ldots, Rx_M$ are connected to the second electrodes 8, and vice versa. The numbers N, M may be any positive, integer numbers, and may be either the same or different.

The second example device 56 includes a third number, K, of common circuit cores 38, including a fourth number k of circuit cores $38_1, \ldots, 38_k$ configured as first circuit cores 38a and a fifth number K-k of common circuit cores $38_{k+1}, \ldots, 38_K$ configured as second circuit cores 38b. The common circuit cores $38_1, \ldots, 38_k$ configured as first circuit cores 38a form a first circuit core group 57 and the common circuit cores $38_{k+1}, \ldots, 38_K$ configured as second circuit cores 38b form a second circuit core group 58. The fourth and or fifth numbers may be greater than or equal to one.

Each input/output conductive line 39 of each common circuit core $38_1, \ldots, 38_k$ included in the first circuit core group 56 is connected to one corresponding input/output conductive line 39 of each other common circuit core $38_1, \ldots, 38_k$ included in the first circuit core group 56, and also to one corresponding input/output terminal $Tx_n$. For example, first input/output conductive lines $39_1^1, \ldots, 39_1^k$ of each common circuit core $38_1, \ldots, 38_k$ included in the first circuit core group 56 are all electrically connected to a first input/output terminal $Tx_1$. Similarly, each input/output conductive line 39 of each common circuit core $38_{k+1}, \ldots, 38_K$ included in the second circuit core group 57 is connected to one corresponding input/output conductive line 39 of each other common circuit core $38_1, \ldots, 38_k$ included in the second circuit core group 57, and also to one corresponding input/output terminal $Rx_n$.

The common mode voltage lines $44_1, \ldots, 44_K$ of all of the common circuit cores $38_1, \ldots, 38_K$ are all connected to a common mode voltage terminal $V_{CM}$. The capacitance signal conductive lines $45_1, \ldots, 45_k$ of all the common circuit cores $38_1, \ldots, 38_k$ belonging to the first circuit core group 57 are connected to a capacitance signal terminal $V_{cap}$. The capacitance signal conductive lines $45_{k+1}, \ldots, 45_K$ of all the common circuit cores $38_{k+1}, \ldots, 38_K$ belonging to the second circuit core group 58 are connected to the common mode voltage terminal $V_{CM}$.

Alternatively, the capacitance signal conductive line $45_1, \ldots, 45_k$ of each common circuit core $38_1, \ldots, 38_k$ belonging to the first circuit core group 57 may be connected to a corresponding capacitance signal terminal $V_{cap}$.

The output conductive lines $41^1, \ldots, 41^K$ of each common circuit core $38_1, \ldots, 38_K$ are connected to corresponding output terminals $V_{out}^1, \ldots, V_{out}^K$. Similarly, the amplifier input conductive lines $41^1, \ldots, 41^K$ of each common circuit core $38_1, \ldots, 38_K$ are connected to corresponding amplifier input terminals $V_{in}^1, \ldots, V_{in}^K$. In use, when the second example device 56 is connected to a touch panel 3 using the input/output terminals $Tx_1, \ldots, Tx_N$ and $Rx_1, \ldots, Rx_M$, a separate feedback capacitor $C_F$ should be connected between each pair of an output terminal $V_{out}^1, \ldots, V_{in}^K$ and the corresponding amplifier input terminal $V_{in}^1, \ldots, V_{in}^K$. For example, a feedback capacitor $C_F$ should be connected between the first output terminal $V_{out}^1$ and the first amplifier input terminal $V_{in}^1$.

First and second switch conductive lines 42, 43 and control input conductive lines 47 for controlling the multiplexer 46 and switches $S_{FB}$, $S_{CM}$ of each common circuit core $38_1, \ldots, 38_K$ are connected to a controller 59. The controller 59 may take the form of a field programmable gate array. The controller is configured to control and synchronise the multiplexers 46 and switches $S_{FB}$, $S_{CM}$ in order to conduct pressure and capacitance measurements of a touch panel 3 according to any one of the hereinbefore described first, second or third methods of combining capacitance and pressure measurements. Since the physical configuration of the second example device 56 permits any of the first, second or third methods of combining capacitance and pressure measurements to be carried out, the controller may be configured to control more than one of the first, second and third methods and to switch between different methods in dependence on an instruction from the processor 29 of an electronic device 28.

Optionally, the controller 59 may be connected to a communications port COM in order to receive data from the capacitive touch controller 4 or an external timer (not shown), in order to synchronise scanning of electrodes 7, 8 by the second example device 56 and the capacitive touch controller 4. The communications port COM may be a serial communication port or a parallel communication port.

External elements such as a low-pass filter 52, an ADC 53 and/or a synch module 55 may be connected to the second example device, depending upon which of the first, second and third methods of combining capacitance and pressure measurements is used. The ADC 53 may be provided by the processor 29 of the electronic device 28 or an interface thereto. When the second example device 56 is operated in accordance with the third method, a low-pass filter 52 and/or a synch module 55 are not needed.

By including multiple common circuit cores 38 in each of the first and second circuit core groups 57, 58, scan times to read-out a touch panel may be reduced by measuring multiple intersections 16 concurrently or with less delay then would otherwise be possible. For example, the feedback capacitor $C_F$ connected to each amplifier 21 must be discharged between measurements to avoid cross-talk. This requires the first, feedback switch $S_{FB}$ to be closed for a period of time during which further pressure measurements may not be made. However, a second amplifier can be connected to read-out the charge $Q_{piezo}$ from the next electrode in sequence whilst the feedback capacitor of the first amplifier 21 is being discharged.

Using multiple common circuit cores 38 in the first circuit core group 57 may also be useful when the second example device 56 is used in conjunction with a capacitive touch controller 4 which supports driving multiple transmission electrodes Tx simultaneously.

The second example device 56 may include other components, for example timers or clocks, a low pass filter 52, ADC 53 and/or a synch module 55. The second example device 56 may include additional terminals for connection to external power supplies and/or system ground, to receive external clock timing and/or to allow diagnostics and/or configuration of the controller 59

Using common circuit cores 38 to provide both the first circuit cores 38a and second circuit cores 38b can simplify manufacture of the second example device 56. The common circuit cores $38_{k+1}, \ldots, 38_K$ included in the second circuit core group 58 need not be hardwired to connect the capacitance signal conductive lines 45 to the common mode voltage lines 44. Instead, second switch conductive lines 43 corresponding to each common circuit cores $38_{k+1}, \ldots, 38_K$ included in the second circuit core group 58 may be supplied with a DC bias voltage which keeps the second switch S connected to the common mode voltage lines 44 in use. The latter configuration may allow greater flexibility for original equipment manufacturers and/or end users to develop applications using the second example device 56.

In other examples, the first and second circuit core groups 57, 58 need not be provided by common circuit cores 38 configured as either first or second circuit cores 38a, 38b, and instead the first circuit core group 57 may include first circuit cores 38a and the second circuit core group may include second circuit cores 38b.

Second Touch Panel

Figure 14:
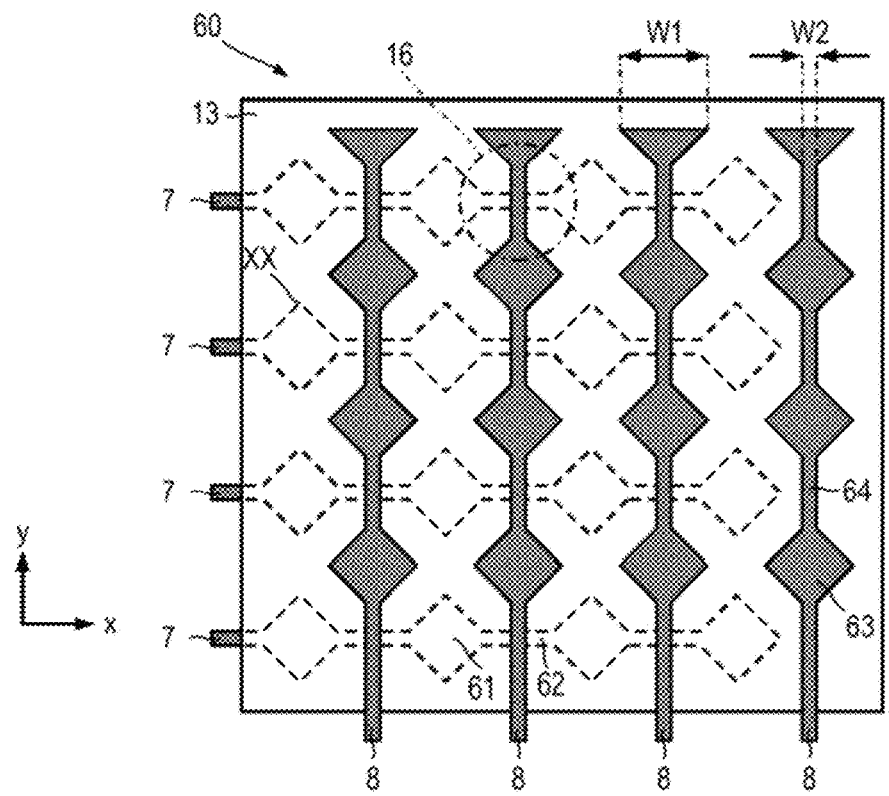
FIG. 14 is a plan view of electrode layouts for a second touch panel.

Referring also to FIG. 14, a layout of first and second electrodes 7, 8 for a second touch panel 60 is the same as the first touch panel 3, except that the first and second electrodes 7, 8 are differently shaped.

Instead of being rectangular, each first electrode 7 may include several pad segments 61 evenly spaced in the first direction x and connected to one another in the first direction x by relatively narrow bridging segments 62. Similarly each second electrode 8 may include several pad segments 63 evenly spaced in the second direction y and connected to one another in the second direction y by relatively narrow bridging segments 64. The pad segments 61, 63 of the first and second electrodes 7, 8 are in the form of diamonds having a first width W1, and the bridging segments 62, 64 of the first and second electrodes 7, 8 have a second width W2.

The first and second electrodes 7, 8 are arranged such that the bridging segments 64 of the second electrodes 8 overlie the bridging segments 62 of the first electrodes 7. Alternatively, the first electrodes 7 and the second electrodes 8 may be arranged such that the pad segments 63 of the second sensing electrodes 8 overlie the pad segments 61 of the first sensing electrodes 7. The pad segments 61, 63 need not be diamond shaped, and may instead be circular. The pad segments 61, 63 may be a regular polygon such as a triangle, square, pentagon or hexagon. The pad segments 61, 63 may be I shaped or Z shaped. The pad segments 61, 63 may have different areas.

Third Touch Panel

Figure 15:
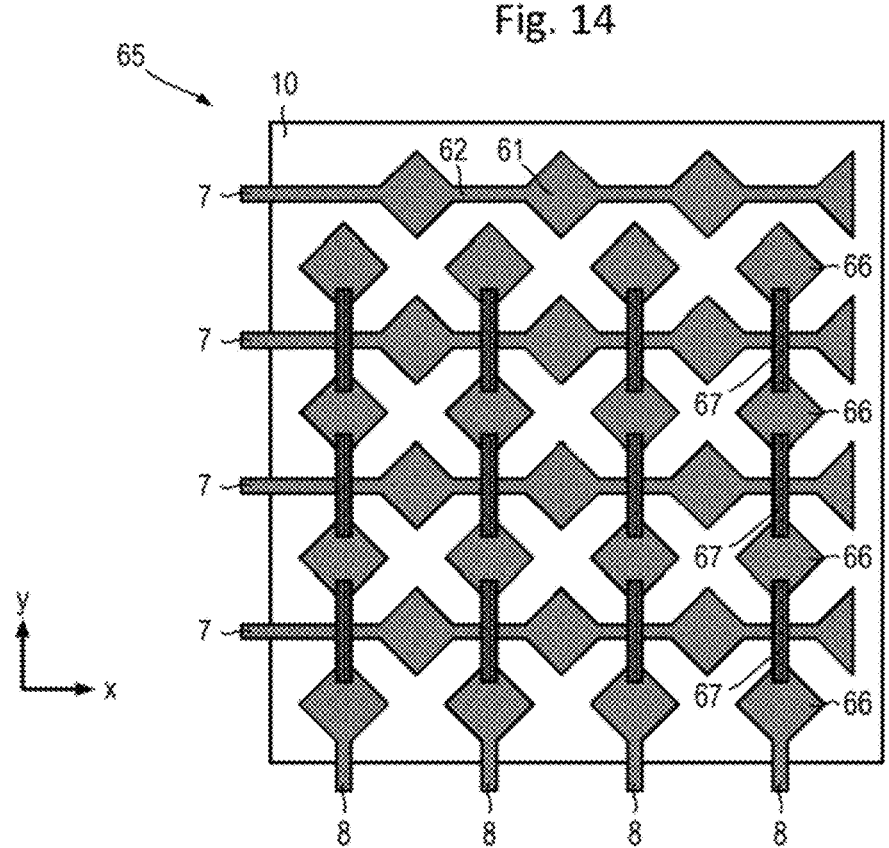
FIG. 15, is a plan view of electrode layouts for a third touch panel.

The second layer structure may be omitted from a third touch panel 65 (FIG. 15). In the third touch panel 65, the second electrodes 8 are disposed on the first face 10 of the first layer structure 5. Each first electrode 7 takes the form of a continuous conductive region and each second electrode 8 includes a number of conductive regions which are electrically connected to one another by jumpers 67 (FIG. 15), each jumper 67 (FIG. 15) spanning a conductive region forming a portion of one of the first electrodes 7.

For example, referring also to FIG. 15, an example of the third touch panel 65 omitting the second layer structure is shown The third touch panel 65 is substantially the same as the first and second touch panels 3, 60, except that the third touch panel 65 does not include the second layer structure 6 and the second electrodes 8 are disposed substantially on the first face 10 of the first layer structure 5, along with the first electrodes 7.

Each first sensing electrode 6 is a continuous conductive region extending in the first direction x in the same way as the second touch panel 60. For example, each first sensing electrode 7 may include several pad segments 61 evenly spaced in the first direction x and connected to one another in the first direction x by relatively narrow bridging segments 62. Each second sensing electrode 8 may comprise several pad segments 66 evenly spaced in the second direction y in the same way as the second touch panel 60. However, unlike the second touch panel 60, the pad segments 66 of the third touch panel 65 are disposed on the first face 10 of the first layer structure 5 and are interspersed with, and separated by, the first electrodes 7. The pad segments 66 corresponding to each second electrode 8 are connected together by conductive jumpers 67. The jumpers 67 each span a part of a first electrode 7 and the jumpers 67 are insulated from the first electrodes 7 by a thin layer of dielectric material (not shown) which may be localised to the areas around the intersections of each jumper 67 with the first electrodes 7.

Alternatively, a thin dielectric layer (not shown) may overlie the first face 10 of the first layer structure 5, the first electrodes 7 and the pad segments 66 of the second electrodes 8. Conductive traces (not shown) extending in the second direction y may be disposed over the single thin dielectric layer (not shown), each conductive trace (not shown) overlying the pad segments 66 making tip one second electrode 8. The overlying conductive traces (not shown) may connect the pad segments 66 making up each second electrode 8 using vias (not shown) formed through the single thin dielectric layer (not shown).

Patterned Common Electrode

The common electrode 9 need not be formed as a continuous layer of conductive material. Instead, the common electrode may take the form of a region of conductive material arranged as a grid.

Using a patterned common electrode 9, the value of a mutual capacitance between a first or second electrode 7, 8 and the common electrode 9 may be reduced. Using a patterned common electrode 9 may allow the common electrode 9 to be disposed between a user's digit/stylus and the first and second electrodes 7, 8 without screening electrostatic interactions between the user's digit/stylus and the first and second electrodes 7, 8. A configuration with the common electrode 9 towards the outside may be advantageous for touch panels 3, 60, 65 which are integrally embedded in a display 27 of an electronic device 2, 37, 56.

Figure 16:
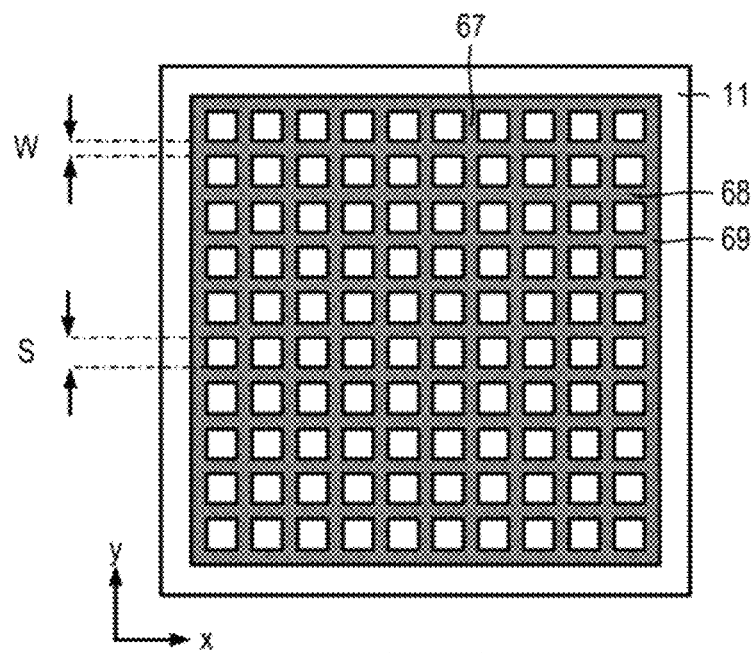
FIG. 16, is a plan view of a patterned common electrode.

For example, referring also to FIG. 16, a layout for a patterned common electrode is shown.

A patterned common electrode 67 may take the form of a Cartesian grid. The conductive region of the patterned common electrode 67 includes struts 68 extending in the first direction x and having a width W in the second direction y, and struts 69 extending in the second direction y and having a width W in the first direction x. The struts 68 extending in the first direction x are evenly spaced in the second direction y with a spacing S, and the struts 69 extending in the second direction y are evenly spaced in the first direction x with the same spacing S. The struts 68, 69 are joined where they intersect such that the patterned common electrode 67 is formed of a single region of conductive material.

The patterned common electrode 67 may be arranged to reduce the magnitude of the mutual capacitances between the first and second electrodes 7, 8 and the common electrode 9.

A patterned common electrode 67 need not be arranged as a Cartesian grid, and any other continuously connected two-dimensional pattern may be used. A patterned common electrode 67 need not use a repeating lattice pattern, and irregular or quasi-periodic arrangements may be used instead.

Interpolation of Pressure Values

The separation between adjacent electrodes 6, 7 in a projected capacitance touch panel, sometimes referred to as the pitch, may be relatively coarse, for example, 1 to 5 mm or larger than 5 mm. If the positions of user interactions were determined only at the resolution of the pitch, projected capacitance touch panels would not be able to provide accurate positions of user interactions or smoothly follow a path traced by a user. To provide more accurate locations, projected capacitance touch panels typically employ interpolation methods, for example, using an electrode having a peak signal and also the adjacent electrode signals, in order to infer a touch location using linear interpolation, quadratic interpolation or interpolation using higher order polynomials or other suitable functions. Such interpolation is possible because a user interaction may alter the capacitances of several adjacent sensing electrodes simultaneously.

Figure 17:
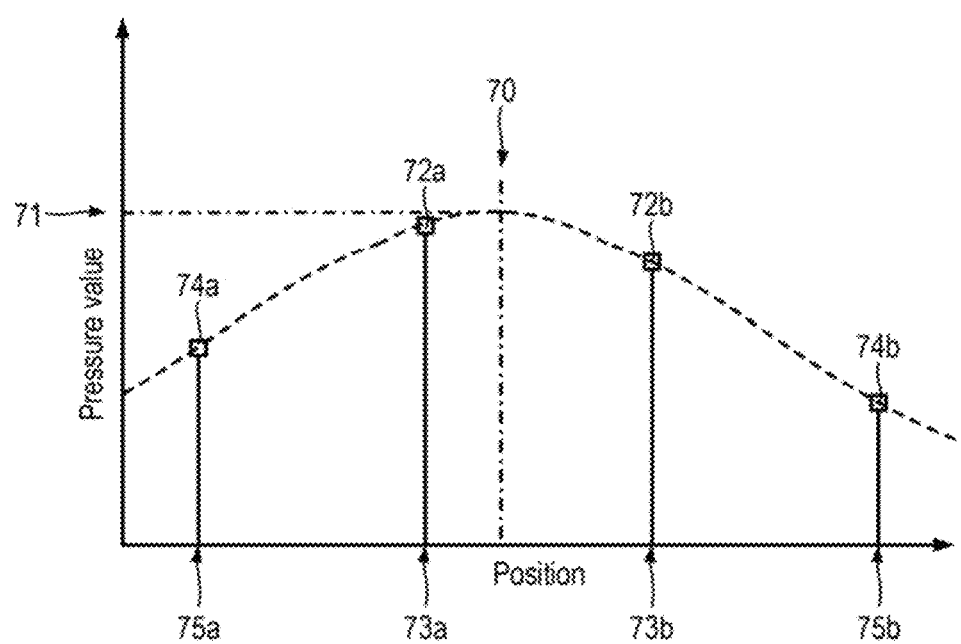
FIG. 17 illustrates using interpolation methods to infer a location and/or a pressure corresponding to a user interaction with the touch panel system shown in FIG. 2.

FIG. 17 illustrates using interpolation methods to infer a location and/or a pressure of a user interaction.

When a user presses on a touch panel 3, 60, 65, the layer of piezoelectric material 12 embedded in the touch panel 3, 60, 65 will experience strain across a relatively broadened area. For example, this could be because the rigidity of a glass or plastic cover lens (not shown) overlying the touch panel 3, 60, 65 spreads a compressive load over a larger area and/or because the layer of piezoelectric material 12 experiences in-plane stretching. For example, a user interaction at a precise location 70 applying a peak pressure 71 may result in pressure values 72*a* and 72*b* being determined for electrodes 7, 8 at locations 73*a*, 73*b* which bracket the precise location 70. A user interaction at a precise location 70 may also result in pressure values 74*a* and 74*b* being determined for electrodes 7, 8 at locations 75*a*, 75*b* which are further from the precise location 70 and adjacent to the pair of bracketing locations 73*a*, 73*b*.

The pressure values 72*a*, 72*b* are slightly different from the peak pressure 71 which would be measured at the precise location 70 of the user interaction, and will vary depending on the relative position of the precise location 70 with respect to the bracketing locations 73*a*, 73*b*. As such, threshold pressure values for responding to user interactions should be spaced widely enough to avoid mis-registrations due to the relative position of the precise location 70 with respect to the bracketing locations 73*a*, 73*b*. This may lead to a coarse resolution of pressure values for pressure touch applications. The potential resolution of pressure touch applications may be improved by using interpolation to estimate the peak pressure 71.

The device 2, 37, 56 for pressure measurement, or the processor 29, may calculate an estimate of the precise location 70 and/or the peak pressure value 71 using the largest value 72*a* and the corresponding location 73*a* in combination with the two next nearest values 72*b*, 74*a* and the corresponding locations 73*b*, 75*a*. Alternatively, the device 2, 37, 56 for pressure measurement, or the processor 29, may calculate an estimate of the precise location 70 and/or the peak pressure 71 using the pair of bracketing values 72*a*, 72*b* and locations 73*a*, 73*b*. The device 2, 37, 56 for pressure measurement, or the processor 29, may calculate an estimate of the precise location 70 and/or the peak pressure 71 using the pair of bracketing values 72*a*, 72*b* and locations 73*a*, 73*b* and the adjacent values and locations 74*a*, 74*b*, 75*a*, 75*b*. The device 2, 37, 56 for pressure measurement, or the processor 29, may calculate an estimate of the precise location 70 and/or the peak pressure 71 using linear interpolation, quadratic interpolation or interpolation using higher order polynomials or other suitable functions.

In this way the resolution for pressure touch applications may be improved by applying interpolation methods to pressure values to estimate a peak pressure 71 of a user interaction. Interpolation may also be used to improve estimates of user interaction locations determined using pressure values.

The capacitive touch controller 4 may also use interpolation of capacitance values 26 to improve the accuracy of determining the locations of one or more user interactions.

Second Touch Panel System

Figure 18:
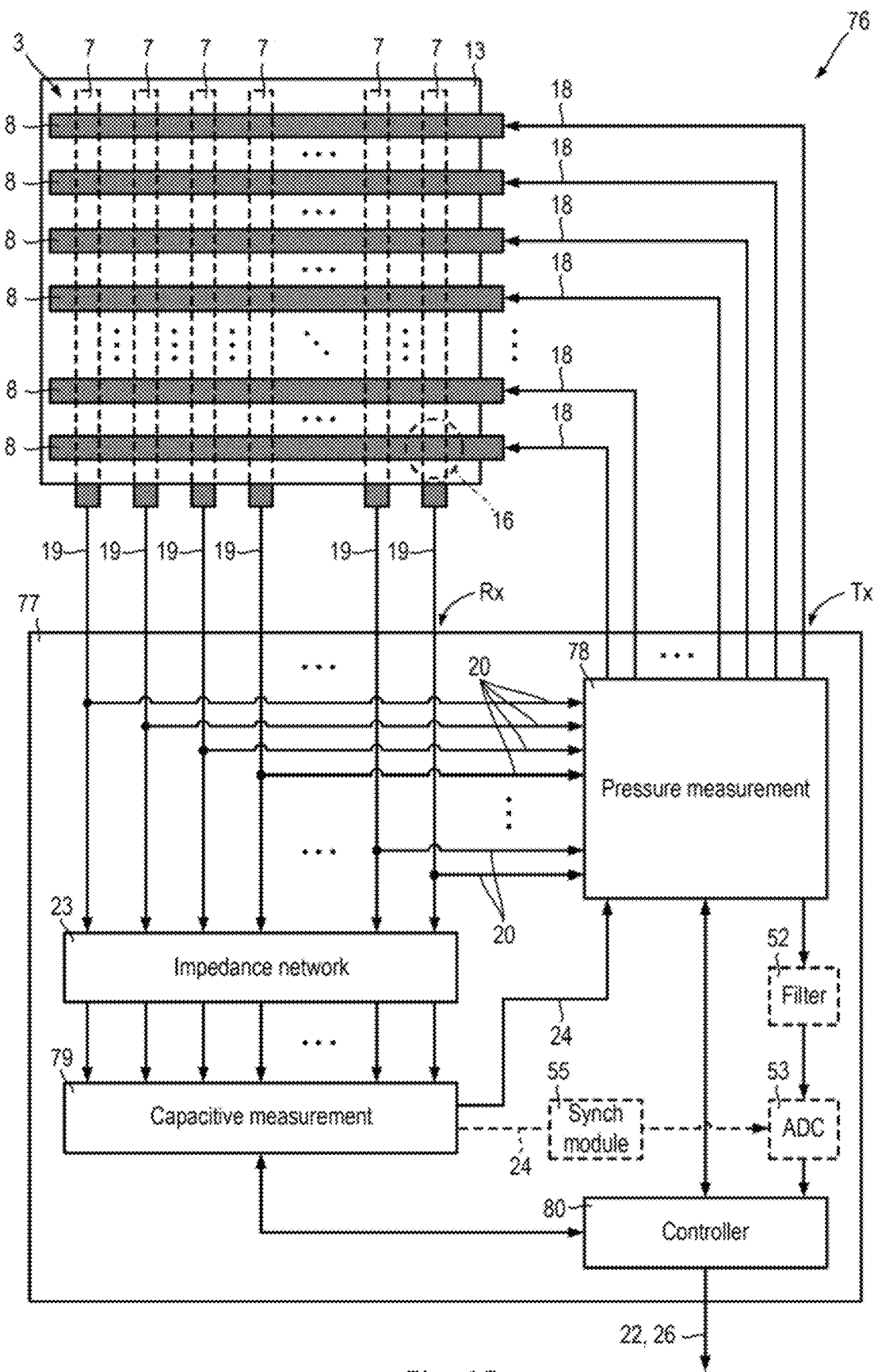
FIG. 18, is a plan view of a second touch panel system for combined pressure and capacitance measurements.

Referring also to FIG. 18, a second touch panel system 76 does not use a separate capacitive touch controller 4.

The second touch panel system 76 includes a touch panel 3 and a combined pressure and capacitive controller 77. The combined pressure and capacitance controller 77 includes a pressure measurement module 78 which provides the same functions as the device 2, 37, 56 for pressure measurement and which includes one or more circuit cores 38a, 38b, 38. The combined pressure and capacitive controller 77 also includes an impedance network 23 and capacitive measurement module 79 which provides the same functions as a separate capacitive touch controller 4. The pressure measurement module 78, impedance network 23 and capacitive measurement module 79 interrelate to one another and function is the same way as the first touch panel system 1.

The second electrodes 8 are connected to transmission terminals Tx by first conductive lines 18, and the first electrodes 7 are connected to receiving terminals Rx by second conductive lines 19, or vice versa. In this way, the second electrodes 8 may be driven by one or more amplifiers 21 of the pressure measurement module 78 and induced signals may be received from the first electrodes 7 by the capacitive measurement module 79.

The combined pressure and capacitive controller 77 includes a controller 80 which controls and coordinates the pressure measurements module 78 and the capacitive measurement module 79. The combined pressure and capacitive controller output the pressure signals 22 and capacitance values 26 for use by the processor 29 of the electronic device 28. Alternatively, in some examples the controller 80 may also process pressure and/or capacitance measurements to identify locations and types of user interactions. The controller 80 may be, for example, a field programmable gate array.

The combined pressure and capacitive controller 77 may operate using the first, second and/or third methods of combining capacitance and pressure measurements.

Optionally, the combined pressure and capacitive controller 77 may include one or more low-pass filters 52 configured to filter composite signals 50 output by the amplifiers 21 of the pressure measurement module 78.

Optionally, the combined pressure and capacitive controller 77 may include one or more ADCs 53 to convert signals output from the amplifiers 21 into the digital domain. Optionally, the ADC(s) 53 may have sampling times synchronised to zeros of the capacitance measurement signal 24, $V_{cap}(t)$ by one or more synch modules 55.

The combined pressure and capacitive controller 77 preferably takes the form of a packaged integrated circuit. Incorporating the functions of capacitive and pressure measurements into a single package can allow the second touch panel system 76 to be more easily assembled and/or more compact.

Third Touch Panel System

Figure 19:
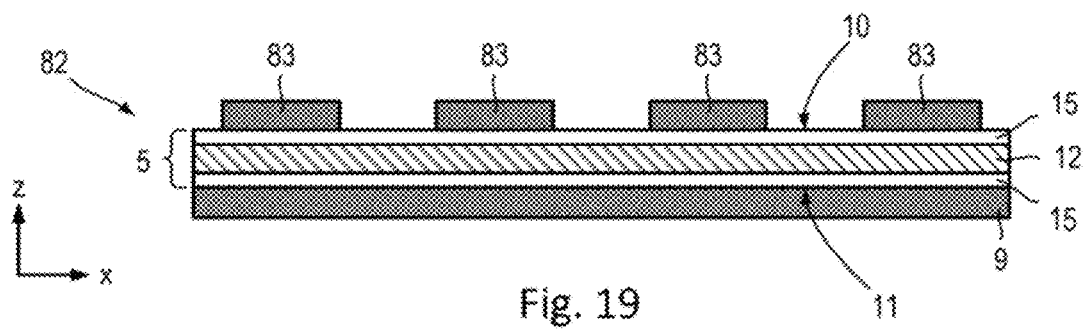
FIG. 19 shows a simplified cross section of a fourth touch panel.

Referring also to FIGS. 19 and 20, a third touch panel system 81 is shown.

The third touch panel system 81 includes a fourth touch panel 82, a capacitive touch controller 4 configured to measure self-capacitance values, an impedance network 23 and a second circuit core 38b. The second circuit core 38b may be provided by a common circuit core 38 having the capacitance signal conductive line 45 electrically connected to the common mode conductive line 44.

The fourth touch panel 82 includes the first layer structure 5 which includes the layer or piezoelectric material. A common electrode 9 is disposed across substantially the whole second face 11 of the first layer structure 5. An array of pad electrodes 83 is disposed on the first face 10 of the first layer structure 5. The pad electrodes 83 are made from the same materials as the first and second electrodes 7, 8.

Each of the pad electrodes 83 is connected to capacitance measurement terminal for the capacitive touch controller 4 via a corresponding pad connection conductive line 84 and the impedance network 23. Each pad connection conductive line 84 is connected to the multiplexer of the second circuit 38b via a corresponding fourth conductive line 85 which connects to the pad connection conductive line 84 at a point between the impedance network 23 and the respective pad electrode 83.

The impedance network 23 AC couples the pad electrodes 83 to the capacitive touch controller 4. For example, the impedance network 23 may take the form of a coupling capacitor $C_C$ connected between each pad connection conductive line 84 and the capacitive touch controller 4.

In this way, self-capacitance values 26 of the pad electrodes 83 may be measured either concurrently or sequentially with pressure signals 22.

Modifications

It will be appreciated that many modifications may be made to the embodiments hereinbefore described. Such modifications may involve equivalent and other features which are already known in the design, manufacture and use of capacitive touch panels and which may be used instead of or in addition to features already described herein. Features of one embodiment may be replaced or supplemented by features of another embodiment. For example, features of one display stack-up or embedded display stack-up may be replaced or supplemented by features of other display stack-ups and/or other embedded display stack-ups.

The layer of piezoelectric material 12 need not be formed from a piezoelectric polymer, and may alternatively take the form of a layer of a piezoelectric ceramic such as lead zirconate titanate (PZT).

The first and second electrodes 7, 8 need not be formed using indium tin oxide (TO) or indium zinc oxide (IZO). Instead, the first and second electrodes 7, 8 may be formed using conductive polymers such as polyaniline, polythiphene, polypyrrole or poly(3,4-ethylenedioxythiophene) polystyrene sulfonate (PEDOT/PSS). Alternatively, the first and second electrodes 7, 8 may take the form of metal mesh films such as aluminium, copper, silver or other metals suitable for deposition and patterning as a thin film. Alternatively, the first and second electrodes 7, 8 may be formed from a metal mesh, nanowires, optionally silver nanowires, graphene, and/or carbon nanotubes.

The common electrode 9 need not be formed using indium tin oxide (ITO) or indium zinc oxide (IZO). Instead, the common electrode 9 may be formed using conductive polymers such as polyaniline, polythiphene, polypyrrole or poly(3,4-ethylenedioxythiophene) polystyrene sulfonate (PEDOT/PSS). Alternatively, the common electrode 9 may take the form of metal films such as aluminium, copper, silver or other metals suitable for deposition and patterning as a thin film. Alternatively, the common electrode 9 may be formed from a metal mesh, nanowires, optionally silver nanowires, graphene, and/or carbon nanotubes.

The dielectric layer or layers 15 need not be formed from a polymer dielectric material such as polyethylene terephthalate (PET), or from layers of pressure sensitive adhesive (PSA) material. Instead, the one or more dielectric layer(s) 15 may include layers of a ceramic insulating material such as aluminium oxide.

Various elements of the touch panel systems 1, 76, 81 have been shown extending along or with reference to orthogonal axes labelled x, y and z which form a right handed orthogonal Cartesian set. However, elements of the touch panel systems 1, 76, 81 need not be aligned with right handed orthogonal Cartesian axes. In particular, the first and second electrode 7, 8 need not be perpendicular, and may intersect at an acute angle $\theta$ satisfying $0<\theta\leq 90$ degrees.

The device 2 for pressure measurements does not need to be provided as a packaged integrated circuit, and may alternatively be provided as a small form-factor printed circuit board which may be rigid or flexible.

The electrodes 7, 8, 9 need not be transparent, and alternatively the electrodes 7, 8, 9, and any connections thereto, may be opaque and sufficiently thin in a direction perpendicular to the thickness direction z that they are not immediately noticeable to the human eye. For example, electrodes 7 8, 9, and any connections thereto, may be less than 100 micrometers ($1\times 10^{-4}$ m) wide, less than 10 micrometers ($1\times 10^{-5}$ m) wide, or thinner.

Examples have been described in which a common electrode 9 is used. However, the common electrode 9 is not strictly required, and in other examples a touch panel may simply include a plurality of first sensing electrodes 7 and a plurality of second sensing electrodes 8 arranged on opposite sides of the layer of piezoelectric material 12.

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicant hereby gives notice that new claims may be formulated to such features and/or combinations of such features during the prosecution of the present application or of any further application derived therefrom.

The invention claimed is:

1. A device comprising:
   a plurality of first input/output terminals for a projected capacitance touch panel, wherein the projected capacitance touch panel comprises a layer of piezoelectric material disposed between a plurality of sensing electrodes and a common electrode;
   one or more amplifiers, each amplifier of the one or more amplifiers having an inverting input, a non-inverting input and an output;
   wherein the non-inverting input of each amplifier of the one or more amplifiers is configured to be switched between a common mode voltage and a capacitance measurement signal;
   wherein the inverting input of each amplifier of the one or more amplifiers is configured to drive a corresponding input/output terminal of the plurality of first input/output terminals based on the capacitance measurement signal;
   wherein each amplifier of the one or more amplifiers is configured such that, when the corresponding input/output terminal is connected to one sensing electrode of the plurality of sensing electrodes, a corresponding amplifier output varies in dependence upon a pressure applied to the projected capacitance touch panel; and
   wherein the device is configured, for a given amplifier of the one or more amplifiers, to:
      couple the inverting input of the given amplifier to one sensing electrode of the plurality of sensing electrodes;
      couple the non-inverting input of the given amplifier to the common mode voltage;
      output a signal from the output of the given amplifier; and
      while the inverting input of the given amplifier remains connected to the one sensing electrode of the plurality of sensing electrodes, couple the non-inverting input of the given amplifier to the capacitance measurement signal.

2. The device according to claim 1 further comprising:
   a touch panel, the touch panel comprising the layer of piezoelectric material disposed between the plurality of sensing electrodes and the common electrode;
   wherein each sensing electrode of the plurality of sensing electrodes is connected to a corresponding input/output terminal.

3. The device according to claim 2, wherein the touch panel comprises:
   a layer structure comprising one or more layers, each layer extending perpendicularly to a thickness direction, the one or more layers including the layer of piezoelectric material, the layer structure having first and second opposite faces, and the one or more layers arranged between the first and second opposite faces such that the thickness direction of each layer is perpendicular to the first and second opposite faces;
   wherein the plurality of sensing electrodes comprises a plurality of first sensing electrodes disposed on the first face, each first sensing electrode of the plurality of first sensing electrodes connected to the corresponding input/output terminal; and
   wherein the common electrode is disposed on the second face.

4. The device according to claim 3, wherein the common electrode comprises a region of conductive material arranged in a grid.

5. The device according to claim 3, wherein the plurality of first sensing electrodes comprises a plurality of conductive pads disposed on the first face in an array.

6. The device according to claim 3, wherein the plurality of sensing electrodes further comprises a plurality of second sensing electrodes disposed overlying the first face of the layer structure and arranged such that the layer structure is between the plurality of second sensing electrodes and the common electrode;
   wherein each second sensing electrode of the plurality of second sensing electrodes is connected to the corresponding input/output terminal.

7. The device according to claim 6, wherein each first sensing electrode of the plurality of first sensing electrodes extends in a first direction and the plurality of first sensing electrodes are arrayed spaced apart perpendicular to the first direction, and wherein each second sensing electrode of the plurality of second sensing electrodes extends in a second direction and the plurality of second sensing electrodes are arrayed spaced apart perpendicular to the second direction, wherein the first and second directions are different.

8. The device according to claim 6, wherein the touch panel further comprises a second layer structure comprising one or more dielectric layers, each dielectric layer extending perpendicularly to a thickness direction of each dielectric layer, the second layer structure having third and fourth opposite faces, the one or more dielectric layers arranged between the third and fourth opposite faces such that the thickness direction of each dielectric layer is perpendicular to the third and fourth opposite faces;
wherein the plurality of second sensing electrodes are disposed on the third face of the second layer structure and the fourth face of the second layer structure contacts the plurality of first sensing electrodes.

9. The device according to claim 6, wherein the plurality of second sensing electrodes are disposed on the first face of the layer structure, wherein each first sensing electrode of the plurality of first sensing electrodes comprises a continuous conductive region and each second sensing electrode of the plurality of second sensing electrodes comprises a plurality of conductive regions electrically connected to one another by jumpers, each jumper spanning a conductive region forming a portion of one first electrode of the plurality of first electrodes.

10. A portable electronic device comprising the device according to claim 1.

11. The portable electronic device according to claim 10, wherein the touch panel overlies a display screen.

12. The portable electronic device according to claim 10, wherein the touch panel is integrated into a display screen.

13. The device according to claim 1, wherein the device is further configured, for the given amplifier, to carry out a step of determining a pressure applied to the touch panel based on the signal.

14. The device according to claim 1, wherein the one or more amplifiers include the given amplifier and a second amplifier, wherein the device is configured to:
when the inverting input of the given amplifier is coupled to a first sensing electrode of the plurality of sensing electrodes:
couple the inverting input of the second amplifier to a second sensing electrode of the plurality of sensing electrodes; and
couple the non-inverting input of the second amplifier to the capacitance measurement signal; and
when the non-inverting input of the given amplifier is coupled to the capacitance measurement signal, and when the inverting input of the second amplifier remains connected to the second sensing electrode of the plurality of sensing electrodes:
couple the non-inverting input of the second amplifier to the common mode voltage; and
output a second signal from the output of the second amplifier.

15. The device according to claim 14, wherein the device is further configured to:
determine a pressure applied to the touch panel proximate to the first sensing electrode of the plurality of sensing electrodes based on the first signal; and
determine a pressure applied to the touch panel proximate to the second sensing electrode of the plurality of sensing electrodes based on the second signal.

16. A method for a touch panel and first and second amplifiers, the touch panel comprising a layer of piezoelectric material disposed between a plurality of sensing electrodes and at least one common electrode, each amplifier of the first and second amplifiers having an inverting input, non-inverting inputs and an output, the method comprising:
coupling the inverting input of the first amplifier to a first sensing electrode of the plurality of sensing electrodes;
coupling the inverting input of the second amplifier to a second sensing electrode of the plurality of sensing electrodes;
coupling the non-inverting input of the first amplifier to a common mode voltage;
coupling the non-inverting input of the second amplifier to a source which provides a capacitance measurement signal;
outputting a first signal from the output of the first amplifier; and
while the inverting input of the first amplifier remains connected to the first sensing electrode of the plurality of sensing electrodes and the inverting input of the second amplifier remains connected to the second sensing electrode of the plurality of sensing electrodes:
coupling the non-inverting input of the second amplifier to the common mode voltage;
coupling the non-inverting input of the first amplifier to the source which provides the capacitance measurement signal; and
outputting a second signal from the output of the second amplifier.

17. The method according to claim 16, further comprising:
determining a pressure applied to the touch panel proximate to the first sensing electrode of the plurality of sensing electrodes based on the first signal; and
determining a pressure applied to the touch panel proximate to the second sensing electrode of the plurality of sensing electrodes based on the second signal.

18. The method of claim 16, wherein the common mode voltage is equal to a system ground potential.

19. A device comprising:
a plurality of first input/output terminals for a projected capacitance touch panel, wherein the projected capacitance touch panel comprises a layer of piezoelectric material disposed between a plurality of sensing electrodes and a common electrode;
one or more amplifiers, each amplifier of the one or more amplifiers having an inverting input, a non-inverting input and an output;
wherein the non-inverting input of each amplifier of the one or more amplifiers is configured to be switched between a ground voltage and a capacitance measurement signal;
wherein the inverting input of each amplifier of the one or more amplifiers is configured to drive a corresponding input/output terminal of the plurality of first input/output terminals based on the capacitance measurement signal;
wherein each amplifier of the one or more amplifiers is configured such that, when the corresponding input/output terminal is connected to one sensing electrode of the plurality of sensing electrodes, a corresponding amplifier output varies in dependence upon a pressure applied to the projected capacitance touch panel; and
wherein the device is configured, for a given amplifier of the one or more amplifiers, to:

couple the inverting input of the given amplifier to one sensing electrode of the plurality of sensing electrodes;
couple the non-inverting input of the given amplifier to the ground voltage;
output a signal from the output of the given amplifier; and
while the inverting input of the given amplifier remains connected to the one sensing electrode of the plurality of sensing electrodes, couple the non-inverting input of the given amplifier to the capacitance measurement signal.

* * * * *